(12) United States Patent
Welingkar et al.

(10) Patent No.: US 7,603,435 B2
(45) Date of Patent: Oct. 13, 2009

(54) OVER-THE-AIR DEVICE KILL PILL AND LOCK

(75) Inventors: Bharat Welingkar, Los Altos, CA (US); Srikiran Prasad, Santa Clara, CA (US)

(73) Assignee: Palm, Inc., Sunnyvale, CA (US)

( * ) Notice: Subject to any disclaimer, the term of this patent is extended or adjusted under 35 U.S.C. 154(b) by 414 days.

(21) Appl. No.: 11/560,048

(22) Filed: Nov. 15, 2006

(65) Prior Publication Data
US 2008/0115226 A1    May 15, 2008

(51) Int. Cl.
G06F 15/16    (2006.01)
G06F 12/00    (2006.01)
(52) U.S. Cl. ........................ 709/217; 709/218
(58) Field of Classification Search ......... 709/217–218, 709/223–229; 455/410, 412.1, 412.2, 414.2
See application file for complete search history.

(56) References Cited

U.S. PATENT DOCUMENTS

| | | | |
|---|---|---|---|
| 5,757,271 A | 5/1998 | Andrews | |
| 5,961,590 A | 10/1999 | Mendez et al. | |
| 5,968,131 A | 10/1999 | Mendez et al. | |
| 6,023,708 A | 2/2000 | Mendez et al. | |
| 6,085,192 A | 7/2000 | Mendez et al. | |
| 6,131,096 A | 10/2000 | Ng et al. | |
| 6,131,116 A | 10/2000 | Riggins et al. | |
| 6,151,606 A | 11/2000 | Mendez | |
| 6,202,070 B1 | 3/2001 | Nguyen et al. | |
| 6,233,341 B1 | 5/2001 | Riggins | |
| 6,300,863 B1 | 10/2001 | Cotichini et al. | |
| 6,333,684 B1 | 12/2001 | Kang | |
| 6,360,252 B1 | 3/2002 | Rudy et al. | |
| 6,362,736 B1 | 3/2002 | Gehlot | |
| 6,542,729 B1 | 4/2003 | Chmaytelli et al. | |
| 6,587,684 B1 | 7/2003 | Hsu et al. | |
| 6,671,757 B1 | 12/2003 | Multer et al. | |
| 6,694,336 B1 | 2/2004 | Multer et al. | |
| 6,708,221 B1 | 3/2004 | Mendez et al. | |
| 6,738,789 B2 | 5/2004 | Multer et al. | |
| 6,757,696 B2 | 6/2004 | Multer et al. | |
| 6,766,454 B1 | 7/2004 | Riggins | |
| 6,804,699 B1 | 10/2004 | Henrie | |

(Continued)

FOREIGN PATENT DOCUMENTS

EP    1130511 A2    9/2001

(Continued)

OTHER PUBLICATIONS

International Search Report and Written Opinion for International Application No. PCT/US2007/083943, mail date Aug. 19, 2008, 7 pages.

(Continued)

*Primary Examiner*—Zarni Maung
(74) *Attorney, Agent, or Firm*—Foley & Lardner LLP

(57) ABSTRACT

A client device may be managed in the event of, for example, device loss or mislocation. In such a case, a user can effectively cause a restriction command to be generated, where the restriction command is wirelessly transmitted to the client device. The restriction command can be specified to either lock user data on the client device or erase user data on the client device.

31 Claims, 17 Drawing Sheets

U.S. PATENT DOCUMENTS

| | | |
|---|---|---|
| 6,842,695 B1 | 1/2005 | Tu |
| 6,892,225 B1 | 5/2005 | Tu et al. |
| 6,925,476 B1 | 8/2005 | Multer et al. |
| 6,934,767 B1 | 8/2005 | Jellinek |
| 6,944,651 B2 | 9/2005 | Onyon et al. |
| 6,961,567 B1 | 11/2005 | Kuhn |
| 6,970,418 B1 | 11/2005 | Skinner |
| 7,003,668 B2 | 2/2006 | Berson et al. |
| 7,007,041 B2 | 2/2006 | Multer et al. |
| 7,035,878 B1 | 4/2006 | Multer et al. |
| 7,039,679 B2 | 5/2006 | Mendez et al. |
| 2001/0047272 A1 | 11/2001 | Frietas et al. |
| 2002/0065074 A1* | 5/2002 | Cohn et al. ............. 455/422 |
| 2002/0141095 A1* | 10/2002 | Yahiro .................. 360/69 |
| 2002/0183038 A1 | 12/2002 | Comstock et al. |
| 2003/0084005 A1 | 5/2003 | Wong et al. |
| 2003/0103464 A1 | 6/2003 | Wong et al. |
| 2003/0139175 A1 | 7/2003 | Kim |
| 2003/0157947 A1 | 8/2003 | Fiatal et al. |
| 2004/0003266 A1 | 1/2004 | Moshir et al. |
| 2005/0005131 A1* | 1/2005 | Yoshida et al. ............. 713/183 |
| 2005/0073389 A1 | 4/2005 | Chandley |
| 2005/0102257 A1 | 5/2005 | Onyon et al. |
| 2005/0191998 A1 | 9/2005 | Onyon et al. |
| 2006/0025071 A1* | 2/2006 | Yamazaki et al. .......... 455/3.06 |
| 2006/0031541 A1 | 2/2006 | Koch et al. |
| 2006/0084410 A1 | 4/2006 | Sutaria et al. |
| 2006/0149794 A1 | 7/2006 | Ylinen |
| 2006/0173954 A1* | 8/2006 | Maeda et al. ............. 709/203 |
| 2006/0184591 A1 | 8/2006 | Backholm et al. |
| 2006/0234679 A1 | 10/2006 | Matsumoto et al. |
| 2007/0129058 A1* | 6/2007 | Landschaft et al. ....... 455/412.1 |
| 2007/0238443 A1* | 10/2007 | Richardson ............... 455/411 |
| 2008/0114855 A1 | 5/2008 | Welingkar et al. |
| 2008/0125102 A1 | 5/2008 | Abel et al. |

FOREIGN PATENT DOCUMENTS

| | | |
|---|---|---|
| EP | 1130511 A3 | 9/2001 |
| EP | 1130512 A2 | 9/2001 |
| EP | 1130512 A3 | 9/2001 |
| EP | 1130513 A2 | 9/2001 |
| EP | 1130513 A3 | 9/2001 |
| EP | 1158438 A2 | 11/2001 |
| EP | 1158438 A3 | 11/2001 |
| EP | 1180890 A2 | 2/2002 |
| EP | 1180890 A3 | 2/2002 |
| EP | 1187421 A2 | 3/2002 |
| EP | 1187421 A3 | 3/2002 |
| EP | 1215597 A2 | 6/2002 |
| EP | 1215597 A3 | 6/2002 |
| EP | 0996905 B1 | 5/2006 |
| EP | 1667042 A2 | 6/2006 |
| EP | 1667042 A3 | 6/2006 |
| JP | 2000-89995 | 3/2000 |
| JP | 2001-356948 | 12/2001 |
| JP | 2001-356949 | 12/2001 |
| JP | 2001-356950 | 12/2001 |
| JP | 2002-49515 | 2/2002 |
| JP | 2002-149464 | 5/2002 |
| JP | 2002-163137 | 6/2002 |
| JP | 2003-006074 | 1/2003 |
| WO | WO 98/26344 A2 | 6/1998 |
| WO | WO 98/26344 A3 | 6/1998 |
| WO | WO 99/05620 A1 | 2/1999 |
| WO | WO 99/05813 A2 | 2/1999 |
| WO | WO 99/05813 A3 | 2/1999 |
| WO | WO 99/06900 A2 | 2/1999 |
| WO | WO 99/06900 A3 | 2/1999 |
| WO | WO 99/36870 A1 | 7/1999 |
| WO | WO 00/11567 A1 | 3/2000 |
| WO | WO 00/11832 A1 | 3/2000 |
| WO | WO 00/20994 A1 | 4/2000 |
| WO | WO 01/13572 A1 | 2/2001 |
| WO | WO 01/22259 A2 | 3/2001 |
| WO | WO 01/22259 A3 | 3/2001 |
| WO | WO 01/22288 A2 | 3/2001 |
| WO | WO 01/22288 A3 | 3/2001 |
| WO | WO 01/22290 A2 | 3/2001 |
| WO | WO 01/22290 A3 | 3/2001 |
| WO | WO 01/22291 A2 | 3/2001 |
| WO | WO 01/22291 A3 | 3/2001 |
| WO | WO 01/71539 A2 | 9/2001 |
| WO | WO 01/71539 A3 | 9/2001 |
| WO | WO 02/06963 A1 | 1/2002 |
| WO | WO 02/06964 A1 | 1/2002 |
| WO | WO 02/06970 A1 | 1/2002 |
| WO | WO 02/37728 A1 | 5/2002 |
| WO | WO 02/37749 A1 | 5/2002 |
| WO | WO 03/036520 A1 | 5/2003 |
| WO | WO 03/044698 A1 | 5/2003 |
| WO | WO 03/058483 A1 | 7/2003 |
| WO | WO 03/058879 A1 | 7/2003 |
| WO | WO 2004/015576 A1 | 2/2004 |
| WO | WO 2004/095806 A2 | 4/2004 |
| WO | WO 2004/095806 A3 | 4/2004 |
| WO | WO 2004/095796 A1 | 11/2004 |
| WO | WO 2005/112586 A2 | 1/2005 |
| WO | WO 2005/112586 A3 | 1/2005 |
| WO | WO 2005/010715 A2 | 2/2005 |
| WO | WO 2005/048038 A2 | 5/2005 |
| WO | WO 2005/048038 A3 | 5/2005 |
| WO | WO 2005/086662 A2 | 9/2005 |
| WO | WO 2005/086662 A3 | 9/2005 |
| WO | WO 2006/045005 A2 | 4/2006 |
| WO | WO 2006/045102 A2 | 4/2006 |
| WO | WO 2006/053952 A1 | 5/2006 |
| WO | WO 2006/053954 A1 | 5/2006 |
| WO | WO 2006/058967 A1 | 6/2006 |
| WO | WO 2006/061463 A1 | 6/2006 |
| WO | WO 2006/070071 A1 | 7/2006 |
| WO | WO 2008/060920 | 5/2008 |

OTHER PUBLICATIONS

U.S. Appl. No. 11/635,062, filed Dec. 5, 2006, Henrie.

Office Action for U.S. Appl. No. 11/635,062, date mailed Dec. 5, 2006, 7 pages.

* cited by examiner

OVER-THE-AIR DEVICE KILL PILL AND LOCK

CROSS-REFERENCE TO RELATED APPLICATIONS

The present application contains subject matter that may be related to subject matter contained in the following commonly owned co-pending applications: U.S. patent application Ser. No. 11/560,040, filed on Nov. 15, 2006 and entitled "Over-the-Air Device Services and Management"; U.S. patent application Ser. No. 11/560,045, filed on Nov. 15, 2006 and entitled "Dynamic Resource Management"; U.S. patent application Ser. No. 11/560,052, filed on Nov. 15, 2006 and entitled "Device-Side Data De-Duping"; and U.S. patent application Ser. No. 11/560,084, filed on Nov. 15, 2006 and entitled "Server-Controlled Heartbeats".

BACKGROUND

A typical client-side computing device, such as a mobile computing and communications device, relies on various disparate entities for the servicing and management of the client device. For example, a user of the client device may need a desktop computer to access a billing website provided by a service provider for the client device. For data services, the user may have to access a website administered by an organization to which the client device is assigned. Still for other services, the user may have to access a website associated with a manufacturer of the client device.

Moreover, various interface points may have to be available to the user in order for the user to gain access to a full suite of services and management available for the client device. For example, certain services may be acquired via the client device. Other services may have to be acquired using a desktop website. Further still, other particular services may be available only via calls to a customer service representative. Moreover, certain updates for the client device may be obtained by accessing a website provided by a manufacturer of the client device.

As additional service-providing entities are introduced to a system for supporting operations and functionality of the client device, the complexity, at least from the user's perspective, increases commensurately and it accordingly becomes more difficult to fully service and manage the client device.

SUMMARY

According to at least one aspect of one or more embodiments disclosed herein, a system includes: an instruction interface configured to receive an instruction from a user to restrict access to user data stored on a mobile computing device; and a transmission interface configured to wirelessly transmit a computing command executable by the mobile computing device, where the computing command is generated in response to the instruction to restrict access to the user data.

According to at least one other aspect of one or more embodiments disclosed herein, a method of managing a client device includes: receiving an instruction from a user to restrict access to user data stored on the client device; authenticating the user; in response to successful authentication, generating a restriction command corresponding to the received instruction; and wirelessly transmitting the restriction command for execution by the client device.

According to at least one other aspect of one or more embodiments disclosed herein, a mobile computing device includes: a first module configured to wirelessly receive a first command and further configured to, in response to receiving the first command, locking user data on the mobile computing device from being accessible using the mobile computing device; and a second module configured to wirelessly receive a second command and further configured to, in response to receiving the second command, erasing user data on the mobile computing device.

The features and advantages described herein are not all inclusive, and, in particular, many additional features and advantages will be apparent to those skilled in the art in view of the following description. Moreover, it should be noted that the language used herein has been principally selected for readability and instructional purposes and may not have been selected to circumscribe the present invention.

BRIEF DESCRIPTION OF DRAWINGS

FIGS. 13-28 show various screenshots in accordance with one or more embodiments of the present invention.

Each of the figures referenced above depict an embodiment of the present invention for purposes of illustration only. Those skilled in the art will readily recognize from the following description that one or more other embodiments of the structures, methods, and systems illustrated herein may be used without departing from the principles of the present invention.

DETAILED DESCRIPTION

In the following description of embodiments of the present invention, numerous specific details are set forth in order to provide a more thorough understanding of the present invention. However, it will be apparent to one skilled in the art that the present invention may be practiced without one or more of these specific details. In other instances, well-known features have not been described in detail to avoid unnecessarily complicating the description.

In general, embodiments of the present invention relate to a system for providing services to and management of client-side computing devices. Particularly, in one or more embodiments, an over-the-air services and management suite is provided for mobile computing devices, which include handheld computing devices. Examples of handheld computing devices include cellular/mobile phones, personal digital assistants (PDAs), portable e-mail devices, and other computing devices having a form factor suitable for handheld use. However, it is noted that in other embodiments, one or more of the various principles described below may equally apply to other types of client-side computing devices, such as workstation, desktop, and laptop/notebook computers.

Figure 1:
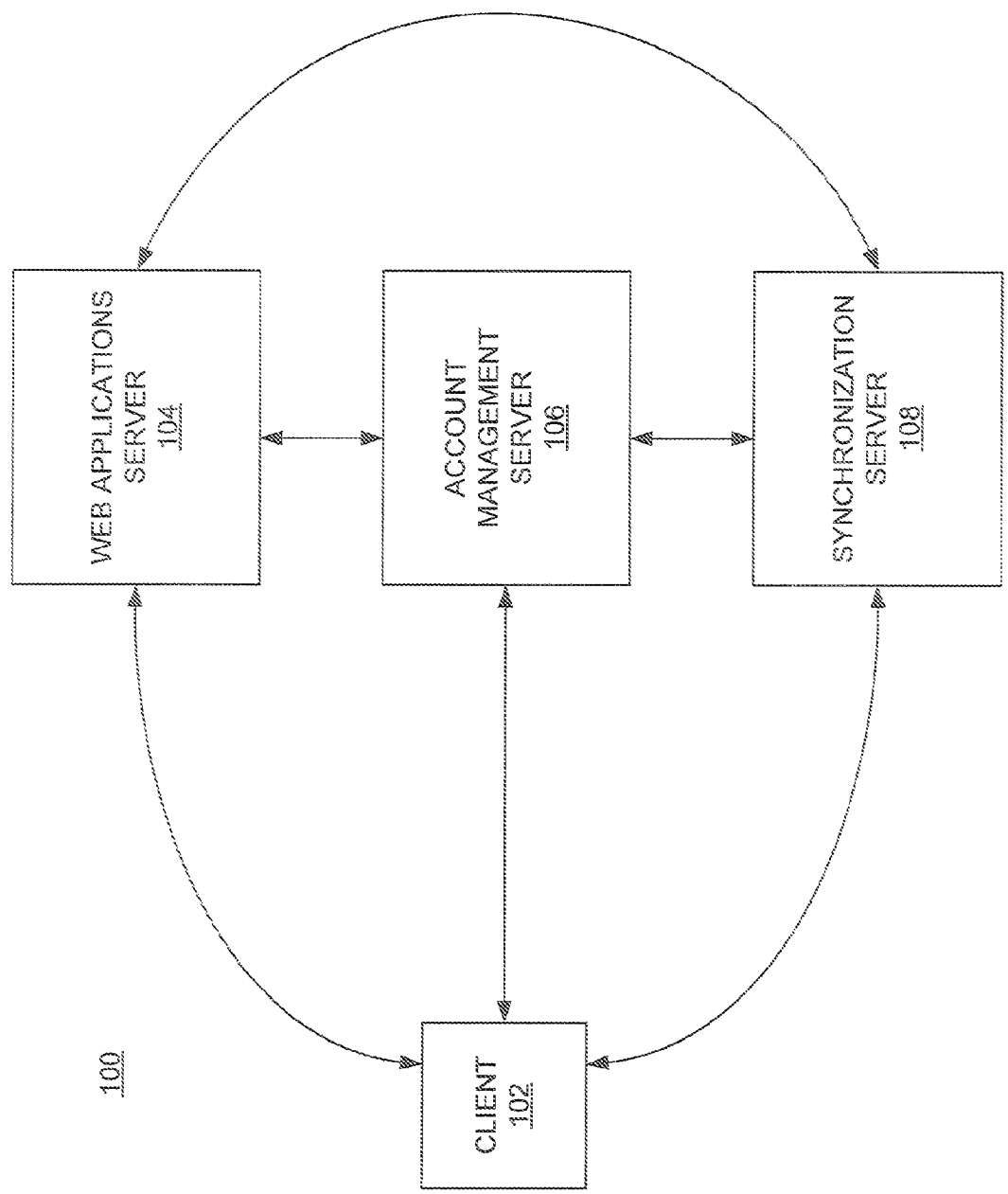
FIG. 1 shows a high-level diagram of an over-the-air device services and management system in accordance with an embodiment of the present invention.

FIG. 1 shows an over-the-air device services and management system 100 in accordance with an embodiment of the present invention. System 100 involves a client-side computing device (also referred to herein as "client device") 102, such as a cellular/mobile phone, personal digital assistant, portable e-mail device, desktop computer, or a laptop/notebook computer. In general, the client device 102 may be any type of device that is capable of communicating with another device for services and/or data.

A server side of system 100 includes a web applications server 104, an account management server 106, and a synchronization server 108. Each of these servers 104, 106, 108 is further described below with reference to FIGS. 2-28.

The servers 104, 106, 108 may be configured for implementation in hardware and/or software. For example, the web applications server 104 may be associated with a physical computer system dedicated for providing services of the web applications server 104. However, in one or more other embodiments, the web applications server 104 may be associated with software resident on a particular computer system that is not just dedicated for providing services of the web applications server 104.

Further, although the web applications server 104, the account management server 106, and the synchronization server 108 are shown as being separate in FIG. 1, functionality of any one or more of the servers 104, 106, 108 may be combined with that of another of the servers 104, 106, 108. Moreover, a location of any one or more of the servers 104, 106, 108 may be the same as that of another of the servers 104, 106, 108. For example, the account management server 106 and the synchronization server 108 may be hosted on the same machine.

In one or more embodiments, the servers 104, 106, 108 may be remotely located from one another. In some such cases, the servers 104, 106, 108 may communicate with one another over a local area network (LAN). For example, if the servers 104, 106, 108 are resident within or part of a particular organization, the servers 104, 106, 108 may communicate over an enterprise network and/or via point-to-point interconnect. Further, in one or more other embodiments, the servers 104, 106, 108 may communicate with one another over a wide area network (WAN). For example, the servers 104, 106, 108 may communicate with one another over the Internet using hypertext transport protocol (HTTP) requests and responses. More specifically, for example, the servers 104, 106, 108 may communicate with one another using extensible markup language (XML) based messages.

Moreover, it is noted that each of the servers 104, 106, 108 may be designed, maintained, managed, and/or delivered by one or more of various entities. For example, the synchronization server 108 may be managed by the manufacturer of the client device 102. In another example, the web applications server 104 and/or the account management server 108 may be designed and/or delivered in contract with a manufacturer of the client device 102. Further, in still another example, one or more of the servers 104, 106, 108 may be designed and/or managed by a service provider arranged to provide voice and/or data services to a user of the client device 102. In yet another example, one or more of the servers 104, 106, 108 may be managed by and/or designed for an organization to which a plurality of client devices 102 belongs or is otherwise associated with.

Figure 2:
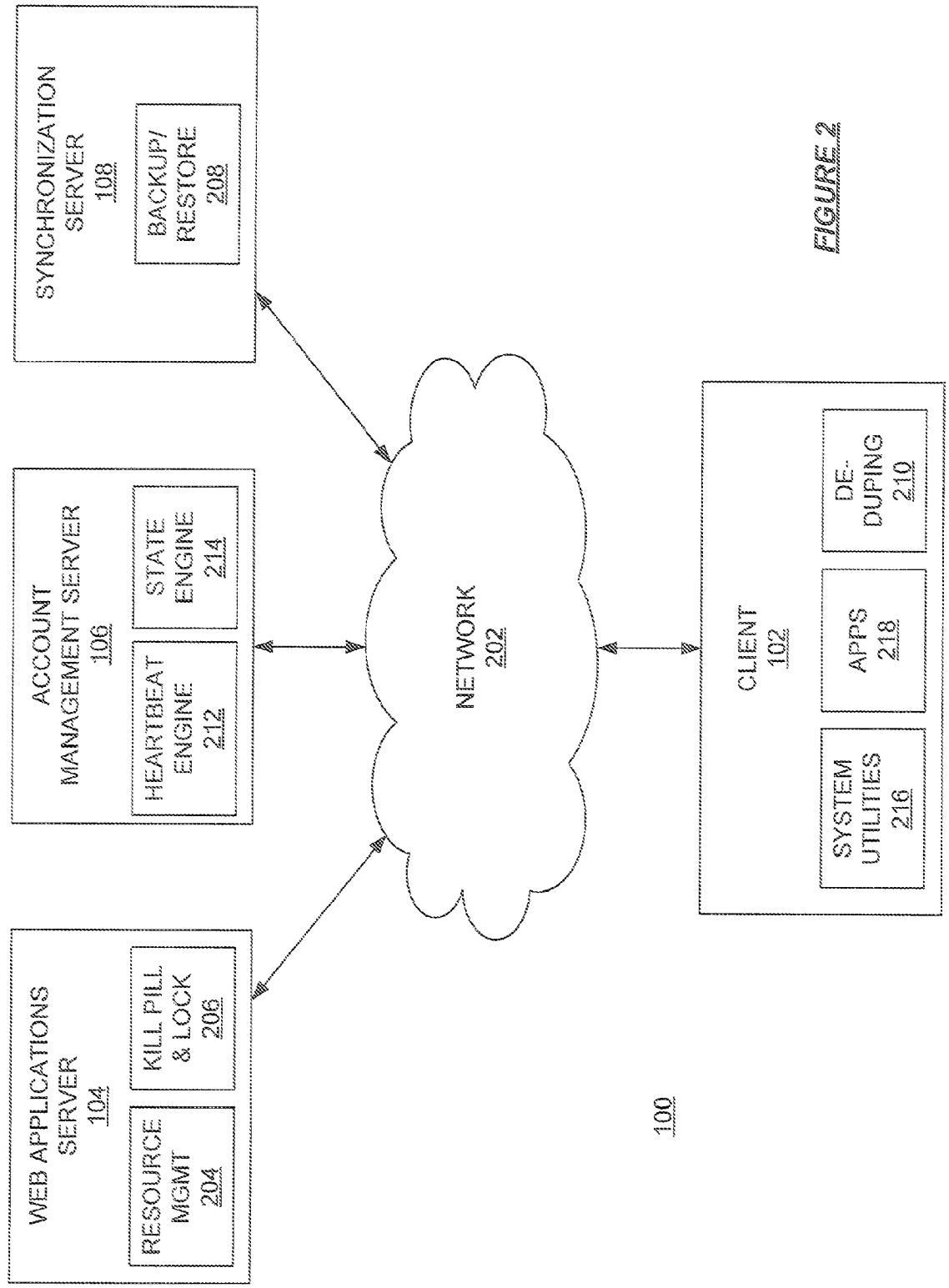
FIG. 2 shows a component-level diagram of an over-the-air device services and management system in accordance with an embodiment of the present invention.

FIG. 2 shows a component-level diagram of system 100. The client device 102 communicates with the web applications server 104, the account management server 106, and the synchronization server 108 over a network 202. In general, the network 202 is any medium over which the client device 102 can wirelessly communicate with one or more of the web applications server 104, the account management server 106, and the synchronization server 108. In other words, the client device 102 is capable of wirelessly communicating with the network 202 to which any one or more of the web applications server 104, the account management server 106, and the synchronization server 108 are operatively connected. It is this sense that system 100 may be described as an "over-the-air" system—the services and management features of servers 104, 106, 108 are provided wirelessly to the client device 102, where the client device 102 represents a central interface point through which a user of the client device 102 can access such services and management features (as opposed to the user having to access a system other than the client device 102).

Further, it is noted that system 100 may be a "push" network, a "pull" network, or a combination thereof. In a "push" network, one or more of the servers 104, 106, 108 push out data to the client device 102. In a "pull" network, one or more of the servers 104, 106, 108 send data to the client device 102 upon request for the data by the client device 102.

In one or more embodiments, the network 202 may be at least in part a cellular network. In another example, the network 202 may be at least in part a wireless data network. Moreover, in still another example, the network 202 may be at least in part a radio network. In yet another example, the network 202 may be at least in part a wireless fidelity ("Wi-Fi") network. Further, in one or more embodiments, the network 202 may be at least in part an Internet-based network. Still further, information transferred between the client device 102 and any one or more of the web applications server 104, the account management server 106, and the synchronization server 108 may be encrypted using industry-standard data encryption techniques (e.g., 128-bit SSL). Moreover, user-specific data stored in any one or more of the web applications server 104, the account management server 106, and the synchronization server 108 may be encrypted using industry-standard data encryption techniques.

Still referring to FIG. 2, the web applications server 104 includes at least in part a resource management component 204 and a "kill pill & lock" component 206. The resource management component 204, as further described below with reference to FIGS. 7 and 8, may be used to centrally manage resources (e.g., data types) used by applications 218 resident on the client device 102. The kill pill & lock component 206, as further described below with reference to FIGS. 9 and 10, may be used to wipe and/or lock data resident on the client device 102.

The account management server 106 includes at least in part a "heartbeat engine" component 212 and a state engine component 214. The state engine component 214, as further described below with reference to FIG. 4, may be used to maintain state information and track state changes of the client device 102. The heartbeat engine component 212, as further described below with reference to FIG. 5, may be used to control an update protocol followed by the client device 102.

Still referring to FIG. 2, the synchronization server 108 includes at least in part a backup/restore component 208. The backup/restore component 208, as further described below with reference to FIG. 11, may be used to backup data from and restore data to the client device 102.

The client device 102 includes system utilities 216, applications 218, and a data de-duping component 210. Use and operation of system utilities 216 and applications 218 will apparent from the description herein. The data de-duping component 210, as further described below with reference to FIG. 12, may be used to detect and/or remove redundant data type instances.

The web applications server 104, the account management server 106, and the synchronization server 108 will now be described in further detail. Specifically, the description below with reference to FIGS. 3-5 relates to the account management server 106, the description below with reference to FIGS. 6-10 relates to the web applications server 104, and the description below with reference to FIGS. 11 and 12 relates to the synchronization server 108. It is noted that although the various functionalities are described below in association with one of the servers 104, 106, 108, such description is primarily for purposes of clarity, and as such, does not limit the ways different described functionalities may be mapped to one or more of the servers 104, 106, 108. Further, the account management server 106, the web applications server 104, the synchronization server 108, and the client device 102 are described with reference to FIGS. 3, 6, and 11 as having modules, where a "module" is any program, logic, and/or functionality implemented in hardware and/or software.

Account Management Server

Figure 3:
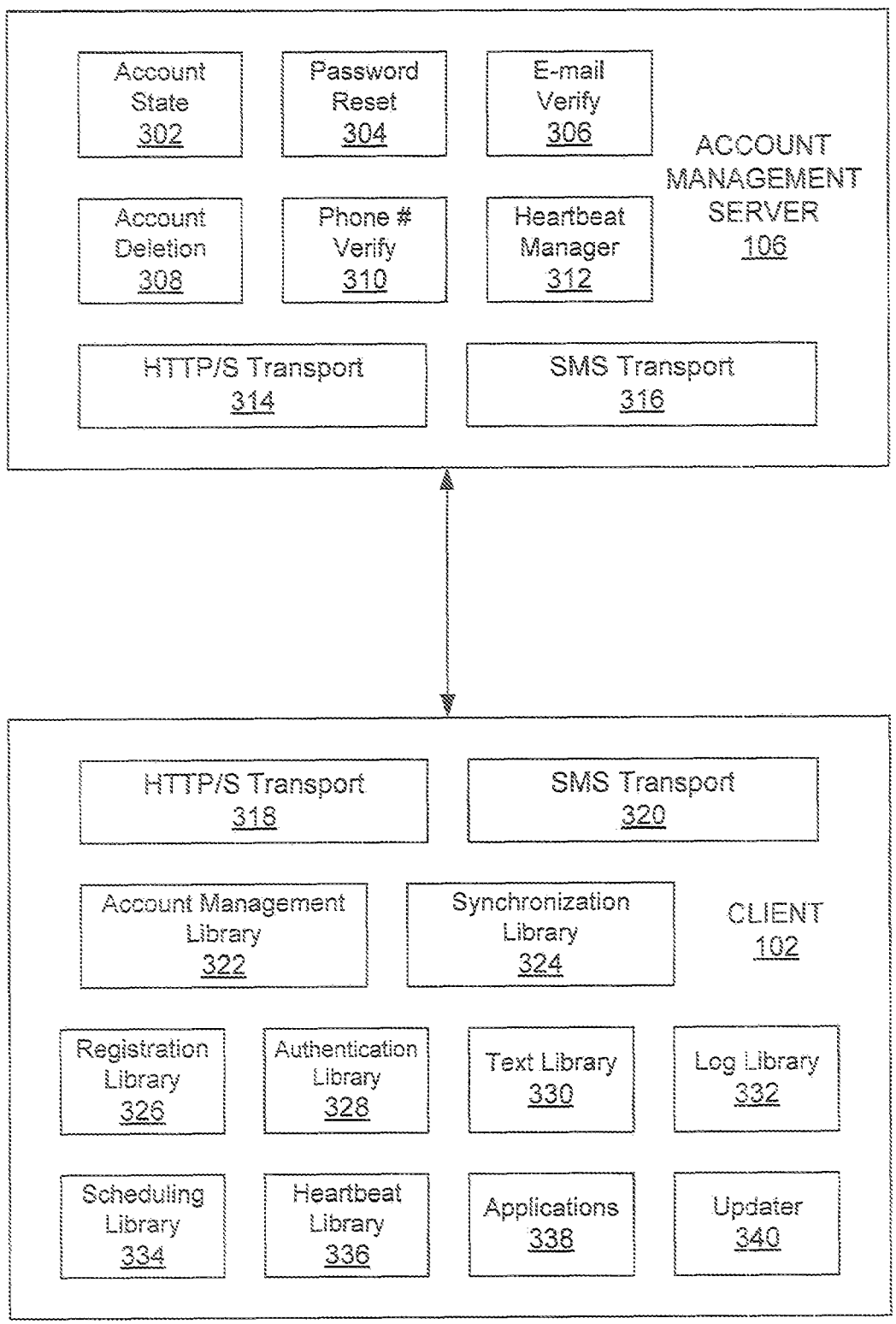
FIG. 3 shows a module-level diagram of an account management server and a client-side computing device in accordance with an embodiment of the present invention.

FIG. 3 shows a diagram of the account management server 106 and the client device 102 in accordance with an embodiment of the present invention. In general, the account management server 106 serves as a central account management point to which one or more vendors, service providers, device manufacturers, and the like may connect with to interface with an account associated with the client device 102.

As shown in FIG. 3, the account management server 106 includes an HTTP transport component 314 and a short message service (SMS) transport component 316. The client device 102 similarly includes an HTTP transport component 318 and a SMS transport component 320. The HTTP transport components 314, 318 may be used for HTTP/S communications. Further, in one or more embodiments, the HTTP transport components 314, 318 may be used to support a simple object access protocol (SOAP), which can be used to exchange XML based messages. The SMS transport components 316, 320 may be used to support SMS message communications. It is noted that SMS messages may be communicated in the form of what are referred to as "text" messages.

Further, the client device 102 is shown as having a plurality of libraries. A "library" may be defined as a collection of subroutines and functions stored in one or more files, usually in compiled form, for linking with other programs. Particularly, in FIG. 3, the client device 102 includes an account management library 322 that may be used to interface resources and functionality with those provided by the account management server 106. Further, the client device 102 includes a synchronization library 324 that may be used to interface resources and functionality with those provided by the synchronization server 108 (further described below with reference to FIGS. 11 and 12).

The client device 102 also includes a registration library 326, an authentication library 328, a text library 330, a log library 332, a scheduling library 334, and a heartbeat library 336. The use and role of the libraries 326, 328, 330, 332, 334, 336 will be clear from the description below with reference to FIGS. 3-28. Further, one or more of the libraries 326, 328, 330, 332, 334, 336 may be reusable in the sense that they may be used in connection with functionalities of the web application server 104, the account management server 106, the synchronization server 108, or any combination thereof.

At least in one aspect of one or more embodiments described herein, the account management server 106 facilitates the creation/registration of and login to an account maintained for the client device 102. Traditionally, to set up an account, a user has had to call a customer service representative, go through a live setup process with a representative at a retailer or service provider of the client device, or access the Internet to go through a setup process available via a website of a retailer, manufacturer, or service provider. Here, in one or more embodiments, the user of the client device 102 may set up an account for his/her client device 102 completely (or almost completely) through use of the client device 102 as described below.

Turning now to a description of ways the account management server 106 and the client device 102 may be used, in one aspect, once a user of the client device 102 registers with the account management server 106 (e.g., an account for that user is created), that user may not have to create another user account again despite replacement of the client device 102, change in platform of the client device 102, and/or loss or corruption of data in the client device 102. Thus, such centralized account management may be thought of as a service provided by system 100.

Figure 13:
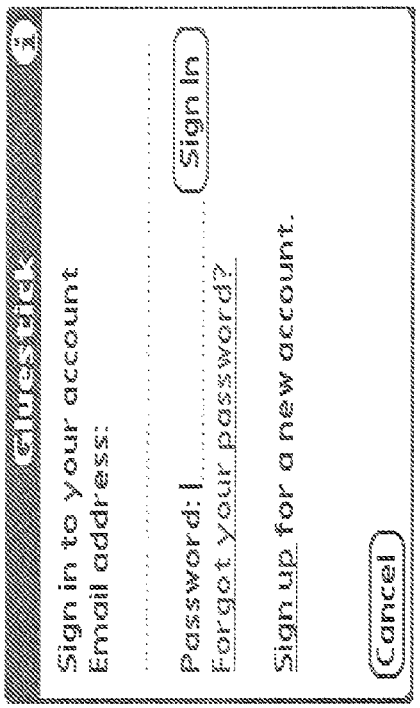
Figure 20:
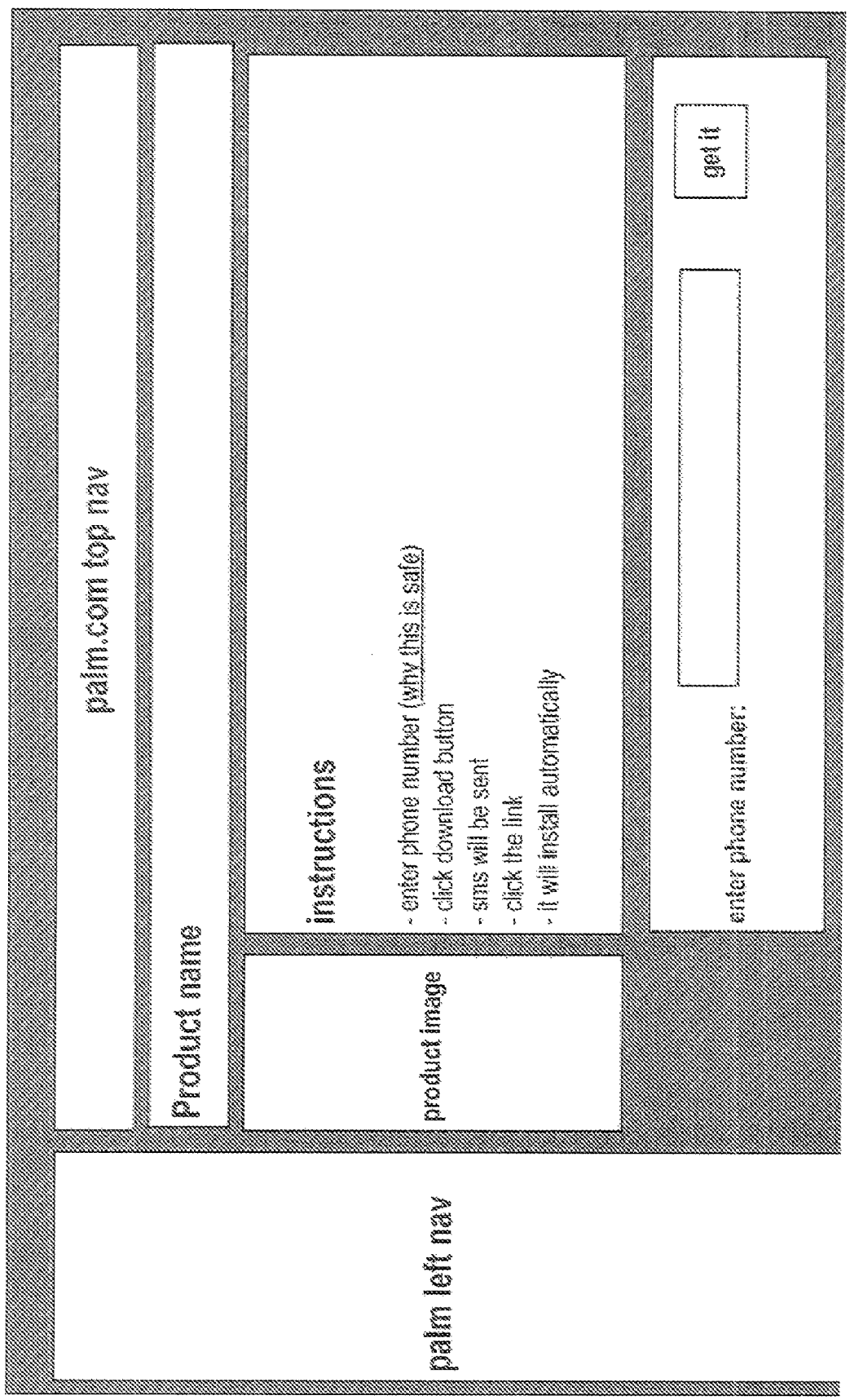
Figure 22:
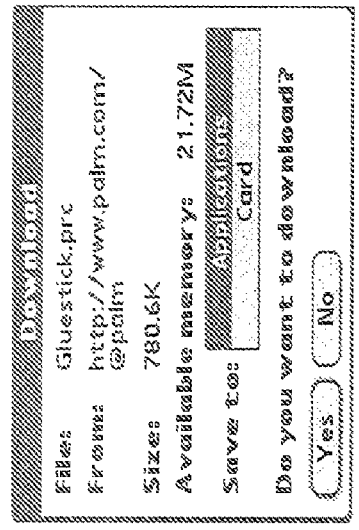
Figure 24:
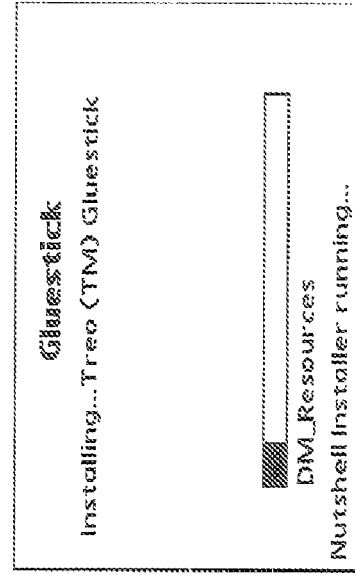
Figure 21:
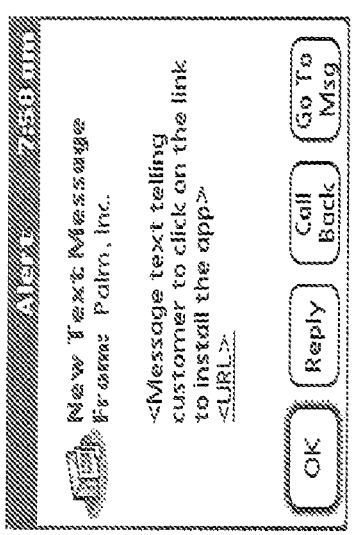
Figure 23:
Figure 26:
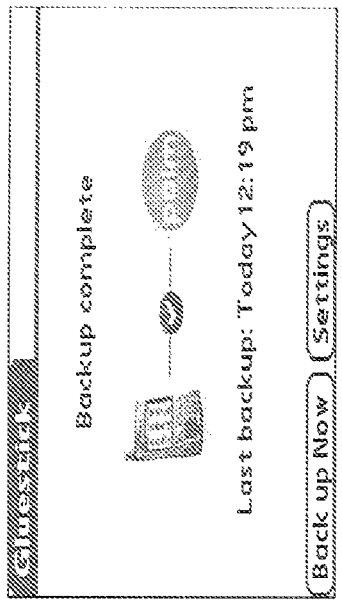
Figure 28:
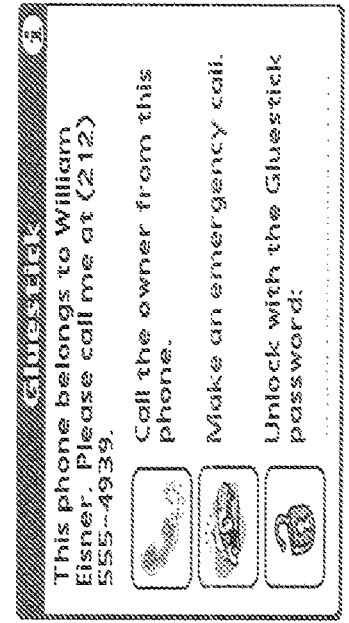
Figure 25:
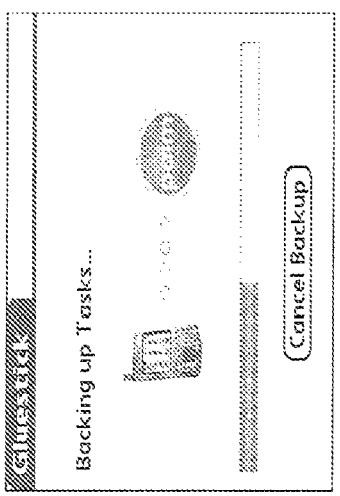

Once particular client software has been installed on the client device 102 (download and installation described further below with reference to FIG. 6), the client software may be launched, whereby the user of the client device 102 is presented with the option to register for a new account or login to an existing account (see, e.g., FIG. 13). If the user chooses to register for a new account, the user is prompted to enter account registration information. Such information may include, for example, name, home and/or work address, home and/or work phone number, social security number, driver's license or identification card number, username, password, and alternate e-mail address (e.g., e-mail address other than one associated with the client device 102). The user may also be prompted to specify challenge questions and answers to be used for recovery of a forgotten username and/or password (see, e.g., FIG. 14). The registration information is then wirelessly submitted over the network 202 (shown in FIG. 2) to the account management server 106. If the account is successfully created, the user may be notified accordingly; otherwise, if the account is not successfully created, the user may be presented with error information possibly containing instructions for reentry of part or all of the registration information.

If the user has an existing account, he/she may indicate so and is then prompted for his/her e-mail address and password. The e-mail address, password, and a phone number of the client device 102 are then communicated over the network 202 (shown in FIG. 2) to the account management server 106. Upon validation of the user's account by an e-mail verify module 306 and a phone number verify module 310 at the account management server 106, the user may be prompted to perform a data backup or restore (see, e.g., FIG. 15). As more fully described below with reference to FIG. 11, the data backup service allows the user to wirelessly backup the data on his/her client device 102 to a server side data store (not shown). Further, as more fully described below with reference to FIG. 11, the data restore service allows the user to wirelessly restore data onto his/her client device 102 from a server side data store (not shown).

Further, in one or more embodiments, in the case that a phone number of the client device 102 has been changed by the user (or an administrator), when the user chooses to login to his/her existing account, the new phone number, along with the e-mail address and password entered by the user, is wirelessly communicated to the account management server 106. The account management server 106 then detects the new phone number associated with the previously known e-mail address and password of the user and updates the user's account to reflect the new phone number. The user may then be prompted with data backup and/or restore service options as described above.

Should the user forget his/her account password, the user accordingly indicates so using client software. This indication, along with the user's e-mail address (see, e.g., FIG. 16), are sent to the account management server 106, which in turn retrieves the challenge questions specified by the user during account registration and wirelessly communicates them over to the client device 102 for response by the user (see, e.g., FIG. 17). If the user's responses to the challenge questions are validated by the account management server 106, the account management server 106 may then prompt the user to enter a new password (see, e.g., FIG. 18). The account management server 106 then updates the user's account to reflect the new password.

Figures 16, 17, 18, 19:
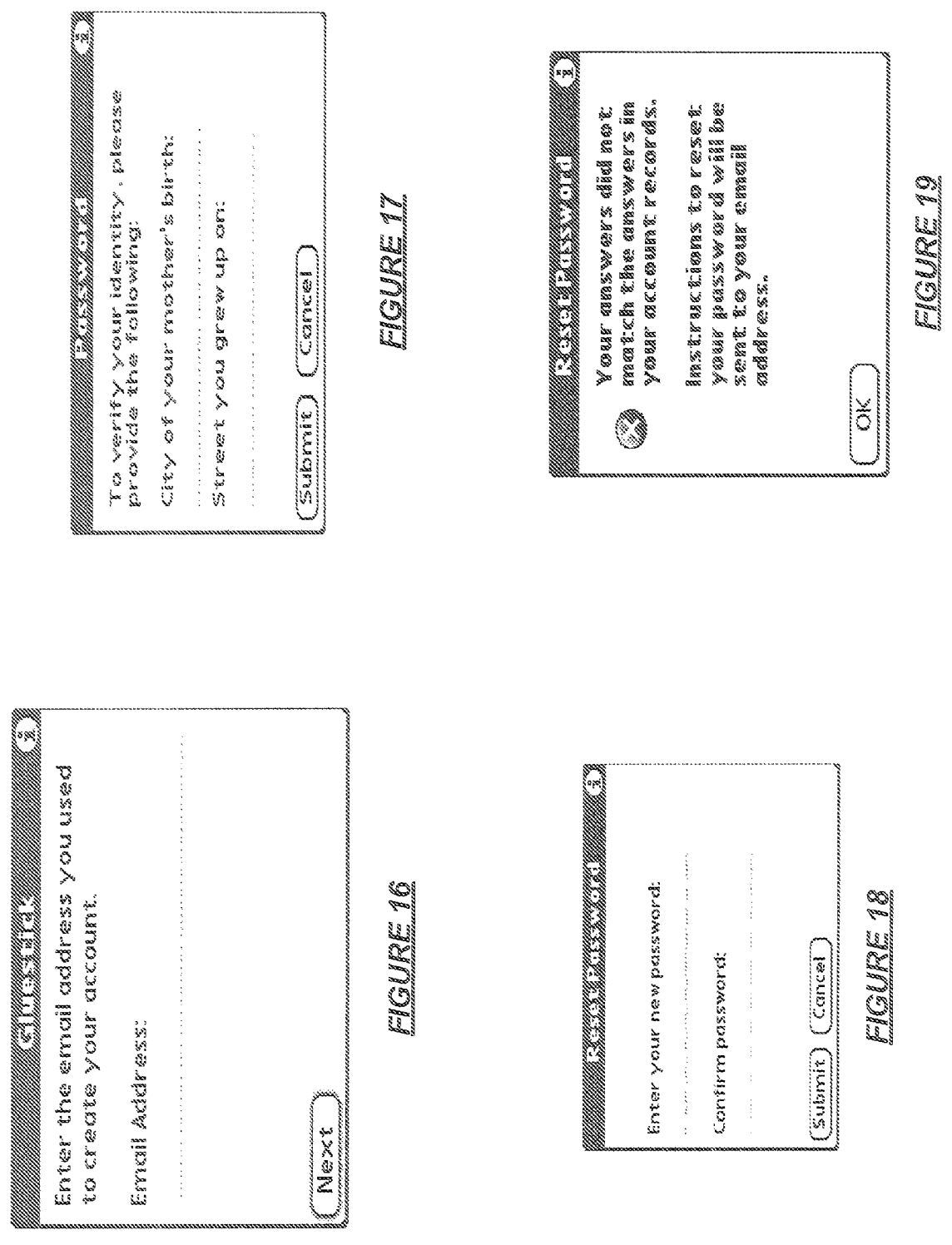

If the user cannot answer his/her challenge questions correctly or in a predetermined number of allowed attempts, the account management server 106, via a password reset module 304, may notify the user that his/her password must be reset by e-mail (see, e.g., FIG. 19). In this case, the password reset module 304 sends the user a hyperlink to the user's e-mail address. The user then from either the client device 102 or another computer system (e.g., desktop or laptop/notebook computer) may click on the hyperlink, which effectively navigates the user through a password reset process for creating a new password. The new password is then communicated to the password reset module 304, which in turn resets the user's account password accordingly.

The above description with respect to how a user of the client device 102 may register or login to an account on the account management server 106 represents use cases. One of the client-side software applications 338 that facilitates and supports these use cases may have certain attributes, requirements, and features as described below. When this client software application is launched, the client may first make sure that the client device 102 is a supported device. In other words, the client may check the client device 102 against a list of devices indicated as being supported by system 100. If the client device 102 is not supported, the user may be directed to an informational website (hosted by, for example, the web applications server 104) for further instructions.

Assuming that the client device 102 is supported, upon launch of the client software application, an end-user license agreement (EULA) may be displayed to the user. In one or more embodiments, the client software application ensures that the user can fully scroll through and read the end-user license agreement. Further, the user may be provided with an option to accept or decline the end-user license agreement. Still further, the end-user license agreement may inform the user of billing arrangements and other fees for use of one or more of the services provided in system 100. In the case that the user declines to accept the terms of the end-user license agreement, the client software application will exit, thereby precluding the user from accessing particular services offered in system 100. On subsequent launches of the client software application, the client software application may re-display the end-user license agreement and prevent the user from accessing particular services until the user accepts the terms of the end-user license agreement.

In the more likely case that the user accepts the terms of the end-user license agreement, the client software application may proceed to one or more of the login/register steps described above. It is noted that should the end-user license agreement be accepted, the end-user license agreement may not be displayed on subsequent launches; however, the user may still have the option of viewing the end-user license agreement at any time.

When the client software application is run on the client device 102, and the user chooses to register a new account, the client provides a registration interface. In the meantime, the client may verify if an account with the phone number of the client device 102 (noting that this phone number is likely a unique identifier for the account) already exists on the account management server 106. If an account with the same phone number is located on the account management server 106, the client may prompt the user to confirm whether the user wants to login instead of register. If the user selects to login, then the client presents a login interface; otherwise, if the user selects to register a new account, the client presents an account registration interface. Additionally, it is noted that in one or more embodiments, a unique identifier other than the client device's 102 may be used. For example, the unique identifier may be the client device's 102 serial number or media access control (MAC) address.

After the user has successfully completed registration, the client may indicate that server registration was successful and may provide the user with an option to configure and/or initiate a data backup. In the case of a successful login, the client may query the account management server 106 to determine whether the user has existing data backed up that can be restored to the client device 102. If the user has valid existing backup data, the client may ask the user if he/she wishes to initiate a data restore. Further, if the user has backed up data but the data cannot be restored to the client device 102 (due to, for example, change in operating system (OS) since last data backup), the user may be informed that data cannot be migrated and that the user needs to "start clean" on the client device 102 for backups if the user wishes to continue with login. If the user does not have any existing backup data, the client may require the user to backup his/her data, just as if the user were a newly-registered user.

In one or more embodiments, the client should allow a new user to register with system 100, and more particularly, with the account management server 106. During registration, the user may be asked for an e-mail address. The client and/or the account management server 106 may validate that the e-mail address is a standard-formatted e-mail address—at a minimum, the client may check for the presence of an "@" sign, and the account management server 106 may perform a more complete validation. Further, the account management server 106 may validate the registered e-mail address as being unique in system 100. Still further, the client may inform the user that a validation e-mail will be sent to the provided e-mail address so as to encourage the user to enter a valid e-mail address.

Additionally, during registration, the user may be asked for a password. A format of the password may be required to have minimum and/or maximum numbers of characters. Moreover, the user may be asked to enter his/her password to ensure proper entry of the password. The client may also require that the password contain both letters and numbers.

Further, during registration, the user may be asked for the name of the country in which the user plans to use the client device 102. This may be supported by a drop-down list of country names.

Moreover, during registration, the user may be asked whether he/she would like to receive marketing, advertising, and/or promotional messages. In one or more embodiments, the default option may be to opt-out of receiving such messages.

Also, as described above, the user may be prompted for challenge questions. In one or more embodiments, the user may be required to select at least two challenge questions and specify answers thereto. For example, challenge questions may be selected from among the following: name of first school; name of first pet; name of street on which you grew up on; city of father's birth; city of mother's birth; grandmother's first name; make/model; and/or name of first employer.

After the user has finished entering registration information for a new account, the client may wirelessly communicate the registration information to the account management server 106. However, in one or more other embodiments, registration information may be wirelessly communicated as the registration information is entered. If the client is unable to wirelessly communicate the registration information to the account management server 106 due to communication or server availability issues, the client may present a message to the user asking the user to try registration again at a later time. In such cases, the user may be informed that entered values have been saved and that the user can try again by, for example, clicking on a "retry" button.

Further, during account creation/registration, the client device 102 may additionally send, for example, the following data to the account management server 106: mobile number; carrier; an International Mobile Equipment Identity (IMEI) and/or Electronic Serial Number (ESN); firmware version; software version; hardware version; synchronization identification number ("SyncID"); carrier DB; device serial number; and/or device model.

In the case of a login interface, the client may prompt the user to enter an e-mail and password. After a certain number of failed attempts, the user may be directed to challenge questions. Further, in one or more embodiments, the user may be provided with the option to go directly to challenge questions at any time that user is prompted for login credentials. If login fails, the user may be informed of authentication failure and may be allowed to try again.

The e-mail and password entered by the user are sent to the account management server 106 for account validation. If the e-mail is found on the account management server 106, the account management server 106 may attempt to use the e-mail and password for account validation. If the e-mail is found on the account management server 106 and account validation is unsuccessful based on the password entered by the user, the client may allow the user to re-enter the password and may additionally provide a password reset option.

Further, during the login sequence, the phone number of the client device 102 may be verified against the account's registered phone number. If the phone number taken from the client device 102 is not the same as the account's registered phone number, the account management server 106 may update the account with this new phone number. If the client is unable to retrieve the phone number from the client device 102, the client may initiate a short message service (SMS) to the account management server 106 and verify against the account's registered phone number.

In the case where the user is attempting to transfer an existing account to the client device 102 with a new phone number (taken from the client device 102), and the desired new phone number is already associated with an existing active account in system 100, system 100 may attempt to transfer the phone number to the new user using an SMS confirmation method.

As described above, when the user is prompted for login credentials, the client may direct the user for a password reset via challenge questions. To do this, the account management server 106 may identify the user by phone number or e-mail in order to accurately determine corresponding challenge questions and answers. The user may be able to initiate a password reset by answering, for example, at least two challenge questions the user selected and answering during registration as described above. Further, in one or more embodiments, the account management server 106 may restrict the number of challenge question reset attempts that are allowed for a particular user account.

If the user is able to correctly answer the challenge questions, the user may be prompted for a new password and then may be asked to confirm the new password. When this occurs, the account management server 106 updates the user's account password accordingly.

If the user is unable to answer the challenge questions successfully, an e-mail may be sent to user's e-mail address of record with instructions on how to perform a web-based password reset. The sent e-mail may contain a hyperlink that points to a password reset website. Additionally, the hyperlink may contain a token that confirms the identity of the user requesting the password reset. In one or more embodiments, this token may only be valid for a limited duration and may be only valid for one password reset use. Moreover, it is noted that the password reset website may be supported by both mobile and desktop web browsers. If the user is validated via passed-in token, the password reset website may then prompt user to enter and confirm a new password. The password reset website may allow the user to reset password and challenge questions as a combined function. Further, the password reset website may confirm to the user that password has been reset if the password reset is successful. If the password reset website is accessed from the client device 102, after the password reset is complete, the client may auto-launch to the login screen. On the other hand, if the password reset website is accessed from a desktop or notebook/laptop computer, after the password reset is complete, the user may be directed to re-login on the client device 102 using the new password. After any password reset or change, the account management server 106 may send an e-mail to user's email address informing the user that password was updated and directing the user to contact customer support if the user did not intend for the password to be changed. Also, after any password reset or change, the account management server 106 may expire all password reset tokens previously issued for the client device 102.

In one or more embodiments, during a login process, the client may resend device information. The account management server 106 may then log this information. If the user's phone number has changed, the account management server 106 may notify the user that their account phone number will be changed and may give user the option to cancel login.

After successful registration or login, the client may store in an authentication library 328 a token that can be used to authenticate the user in future transactions with the account management server 106. Such a token may not include any identifiable user data. Further, such a token may not be transferable to another device. Still further, the account management server 106 may be able to expire the token and force the user to re-login. Still further, previously existing tokens may be deleted after a successful login or registration occurs.

Further, the client may detect if a phone number of the client device 102 changes during on-going usage. If the phone number of the client device 102 changes, the client may expire a previous login token and consequently require the user to re-login.

In one or more embodiments, the client may provide the user with the ability to update user data (e.g., name, e-mail, password). If the user changes his/her e-mail address, the user may be required to reconfirm the new e-mail address. Further, the user may not be allowed to change an e-mail address to an e-mail address that is already associated with an active account.

Still referring to FIG. 3, the account management server 106 includes an account deletion module 308 that provides for account deletion. Account deletion may occur by sending an operator- or administrator-initiated e-mail to the user's email address of record and having the user click a link in the e-mail. After an account has been deleted by this mechanism, the account management server 106 may send a confirmation e-mail to the user informing the user that his/her account has been deleted.

The account management server 106 also includes an account state model 302. The account state model 302 corresponds to the state engine 214 shown in FIG. 2. In general, in one or more embodiments, the account management server 106 may associate an account state with each of a plurality of accounts registered on the account management server 106.

Figure 4:
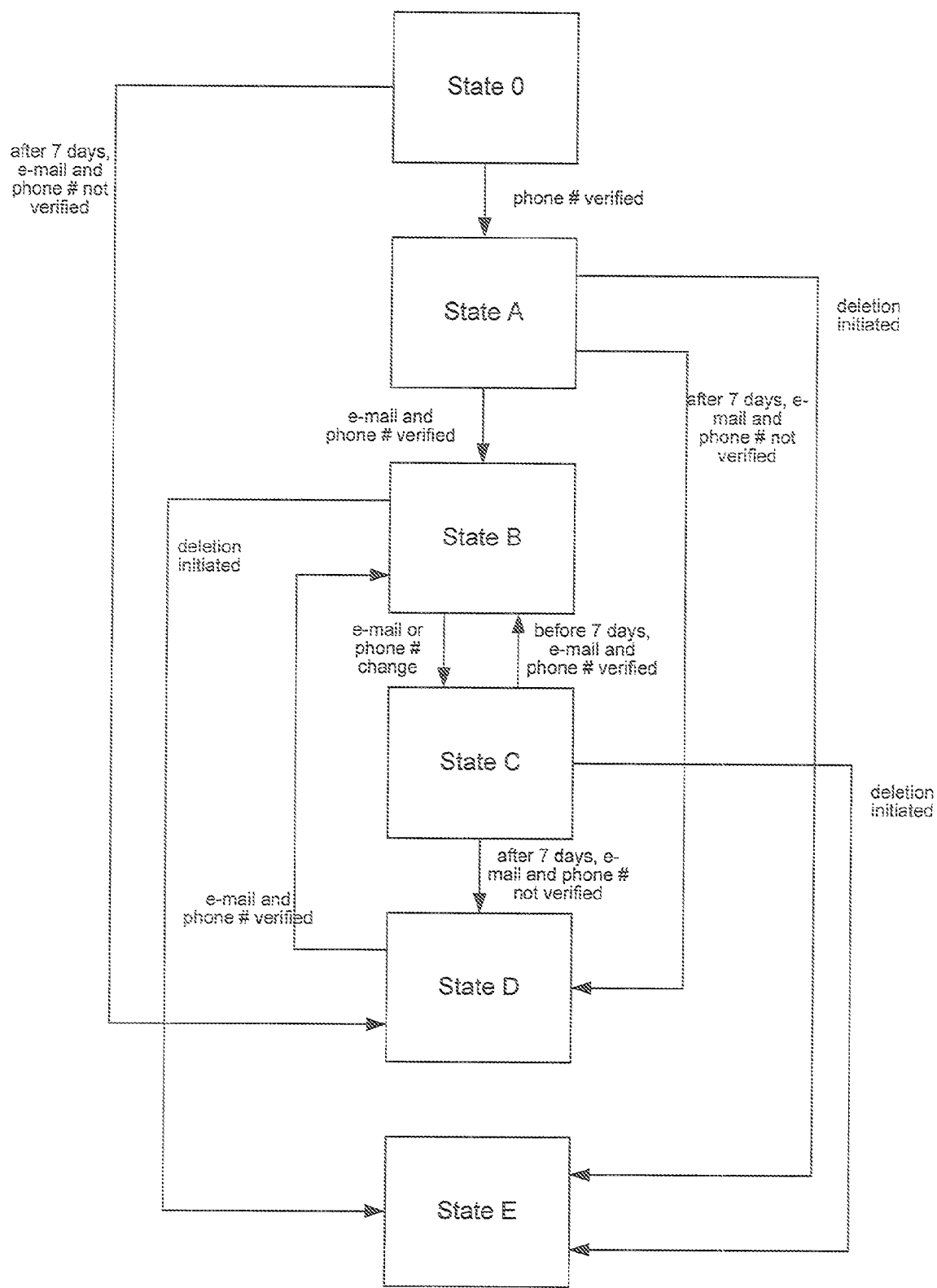
FIG. 4 shows a state transition diagram in accordance with an embodiment of the present invention.

Now referring to FIG. 4, a "State 0" may be referred to as an "inactive pending phone # verification" state. When the registered phone number of a newly registered or logged-in account exists in another active account, the new account may be placed into State 0. Further, if the client is unable to retrieve a phone number for a newly registered account, the new account may be placed into State 0. Moreover, in one or more embodiments, the account management server 106 may allow the client to authenticate with an account that is in State 0, but no other functionality may be allowed until phone number verification occurs. After successful phone # verification, an account in State 0 may change to state A (further described below). If a phone # verification process has not been successfully completed within a predetermined period of time (e.g., 7 days), an account in State 0 may change to State D (further described below).

Still referring to FIG. 4, a "State A" may be referred to as an "active pending verification" state. A newly registered account may be in State A if its registered phone number is not already in another account (i.e., not in State 0). Further, the account management server 106 may allow the client to authenticate with an account that is in State A, but certain functionality may not be allowed. For example, an account in State A may be able to perform a data backup, but it may not be able to perform data restore and kill pill & lock functionalities (further described below). After successful phone # and e-mail verification, an account in State A may change to State B (further described below). If a phone # or e-mail verification process has not been completed within a predetermined period of time (e.g., 7 days), an account in State A may change to State D (further described below). Further, if the user contacts an operator, administrator, or customer service agent to delete their account, an account in State A may change to State E (further described below) using the account deletion module 308 described above.

Continuing with reference to the state transition diagram shown in FIG. 4, a "State B" may be referred to as an "active" state. In general, an account in State B has successfully completed phone # and e-mail verification processes. In one or more embodiments, the account management server 106 may allow the client to authenticate with an account that is in State B. Further, the account management server 106 may allow the client to perform data backup and restore and kill pill & lock functionalities (further described below) if the account is in State B. An account in State B may change to State C (further described below) when an associated phone number or e-mail address is changed (e.g., an account was transferred to a new number, user changed e-mail address on the account). If the user contacts the operator, administrator, or customer service agent to delete their account, an account in State B may change to State E (further described below) using the account deletion module 308 described above.

Still referring to FIG. 4, a "State C" may be referred to as an "active pending re-verification" state. In one or more embodiments, an account in State C may only come from State B as shown in FIG. 4. Further, the account management server 106 may allow the client to authenticate with an account that is in State C. Moreover, the account management server 106 may allow the client to perform data backup and restore and kill pill & lock functionalities (further described below) if the account is in State C. After successful phone # and e-mail verification, an account in State C may change to State B. If phone # or e-mail verification does not occur within a predetermined period of time (e.g., 7 days), an account in State C may change to State D (further described below). If the user contacts the operator, administrator, or customer service agent to delete their account, an account in State C may change to State E (further described below) using the account deletion module 308 described above.

Continuing with reference to the state transition diagram shown in FIG. 4, a "State D" may be referred to as a "locked" state. An account that has not completed phone # and e-mail verification process within a predetermined period of time (e.g., 7 days) may change to State D. In one or more embodiments, the account management server 106 may allow the client to authenticate with an account that is in State D, but certain functionality may not be allowed. For example, an account in State D may not be able to perform data backup and restore and kill pill & lock functionalities (further described below). Further, after the user initiates and successfully completes phone # and e-mail verification, an account in State D may change to State B.

Still referring to FIG. 4, a "State E" may be referred to as a "disabled/deleted" state. The account management server 106 may change an account to State E if the user has requested to delete their account using the account deletion module 308 described above. Further, the account management server 106 may not allow the client to authenticate with an account that is in State E. Moreover, an account in State E may not be able to perform data backup and restore and kill pill & lock functionalities (further described below). Additionally, the account management server 106 may remove user registration information and backup data from an account in State E. In one or more embodiments, such backed up data may be fully unrecoverable.

Referring now more generally to FIG. 4, the account management server 106 may change an account to State 0 when the user transfers their phone number and that phone number exists in another account. Further, the account management server 106 may change an account in the following manner if the user transfers their phone number and that phone number is not in another account: States 0 and A change to State A; State B changes to State C; State C remains in State C; and State D remains in State D.

Further, in one or more embodiments, the account management server 106 may verify that a newly-submitted e-mail address and/or phone number (noting that a phone number is taken directly from the client device 102, not entered by the user) is unique across system 100. If the user is attempting to register an account using an e-mail address that has been verified before, the user may be informed that the e-mail address is already being used and may be presented with password reset options (the assumption being that the user should be logging in, not registering). If the user is attempting to register an account using a phone number that is already associated with another existing active account (in State A, B, or C), the account management server 106 may allow the user to register and then may mark the account as State 0 until the phone number is confirmed. If the phone number is confirmed via, for example, an SMS message, the phone number may be removed from an old account and the account may be placed in State 0. The client may allow the user to "recover" their account by initiating an SMS verification process as described below. An e-mail may be sent to the old account notifying the user that the phone number has been transferred to a new account. If the phone number cannot be confirmed via an SMS message, the account may be disabled.

After successful registration, the client may send a confirmation SMS message to the account management server 106 to verify its phone number. The SMS message may contain account identification and authentication information sufficient for the account management server 106 to perform one or more necessary security checks. If the account management server 106 does not receive the SMS confirmation, the account management server 106 may notify the client to prompt the user to re-send the SMS message periodically until the SMS confirmation message is received.

If the account management server 106 does not receive confirmation for a particular amount of time after registration, the account management server 106 may change the account status to State D. If the user's account is disabled because the phone number cannot be confirmed, the user may be directed by the client to a support website. More particularly, for example, the client may notify the user via an alert that their account has been de-activated and may direct the user to a support website.

After a new e-mail is entered via a new registration or via a user-initiated e-mail address change, the account management server 106 may validate that e-mail address. The account management server 106 may send an e-mail message to the new e-mail address requesting the user to confirm the address. The e-mail message may include a hyperlink with a token that the user can select to link to an e-mail confirmation website. The e-mail confirmation website may be supported by both desktop and mobile web browsers. If a predetermined amount of time elapses and the user has not yet confirmed the e-mail address, the client may notify the user via an alert that the e-mail address has not been verified. The client may give the user option to re-enter the e-mail address at this point. Further, the client may provide the user an option to have a confirmation e-mail resent. Moreover, the client may advise the user to check spam folders and filters if the e-mail is still not received.

If another predetermined amount of time elapses and the user has not yet confirmed the e-mail address, the account management server 106 may change user's account to State D. In this case, the client may notify the user that the client is disabled until the e-mail address is verified. Further, the client may give the user option to re-enter the e-mail address at this point. Further still, the client may provide the user an option to have a confirmation e-mail resent. Moreover, the client may advise the user to check spam folders and filters if the e-mail is still not received. If the user is able to complete a password reset via e-mail as described above before accessing the e-mail verification link, the account management server 106 may mark the e-mail verification process as completed.

Figure 5:
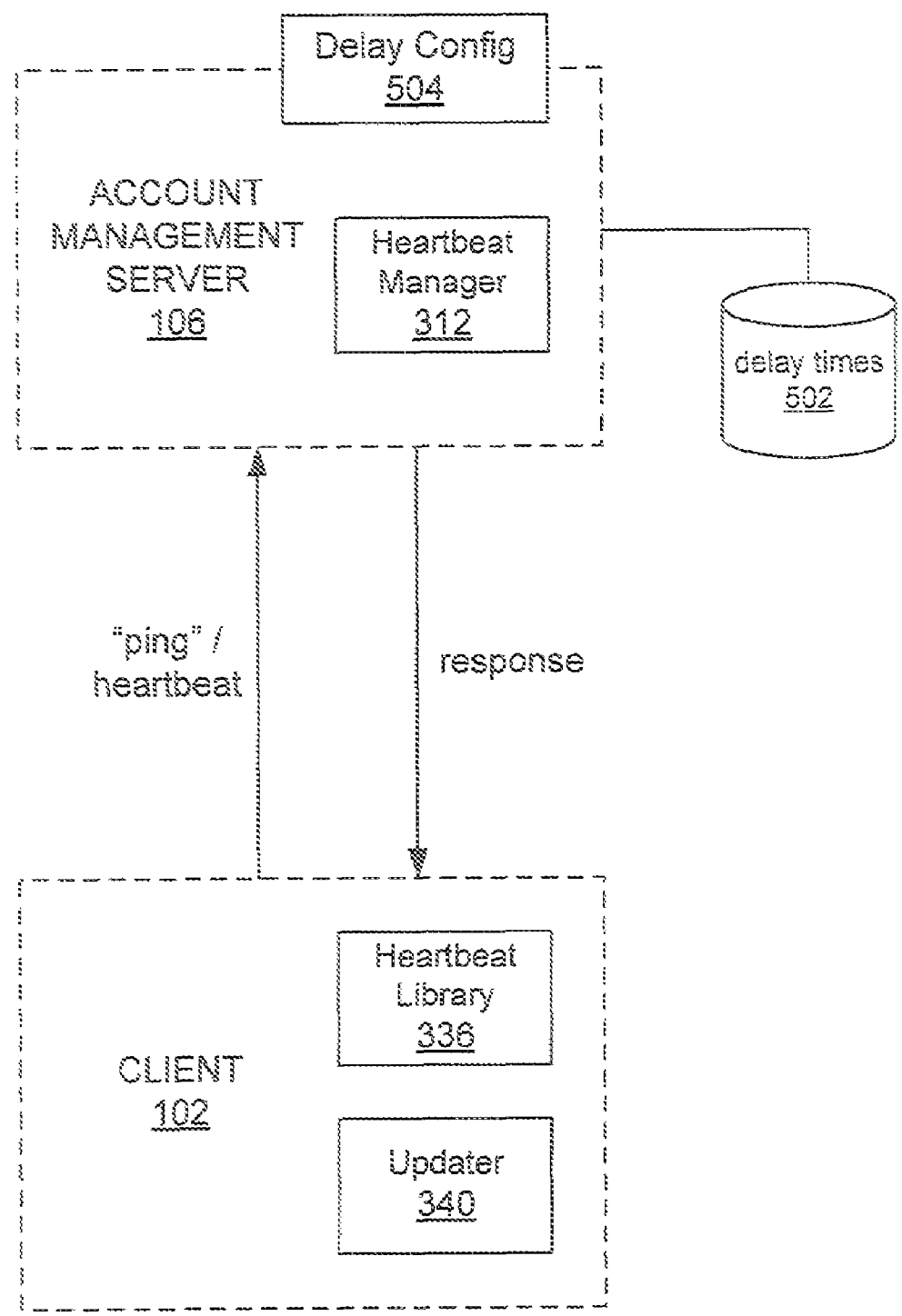
FIG. 5 shows a subsystem of an over-the-air device services and management system in accordance with an embodiment of the present invention.

Referring again to FIG. 3, the account management server 106 includes a heartbeat manager module 312. The heartbeat manager module 312 corresponds to the heartbeat engine 212 shown in FIG. 2. FIG. 5 more particularly shows a subsystem associated with the heartbeat manager module 312.

Typically, a client side component sends out what is referred to as a "ping" or "heartbeat" to a server to let the server know that the client side component is alive and functioning. Such conventional pings are sent out periodically and regularly by the client side component. Here, in one or more embodiments, in general, the client device 102 sends out pings at a frequency and/or format specified and dynamically changeable by the account management server 106.

As shown in FIG. 5, the client device 102 has an updater module 340 that is used to retrieve and receive updates from the account management server 106. These updates may be, for example, operating system updates, security updates, service updates, application updates, data updates, library updates, driver updates, and/or communication protocol updates. The updater module 340 checks for updates via the use of what are referred to as "pings" or "heartbeats" as described above. In one or more embodiments, such heartbeats may be particularly formatted or they may be simply structured HTTP requests. In one or more other embodiments, the heartbeats may be communicated via SMS messages. In still one or more other embodiments, the heartbeats may be communicated via one or more available data and/or voice channels.

In general, an application of the client device 102 may attempt to check for updates from the account management server 106 on some regular or periodic basis (e.g., daily) to see if one or more updates are available and to register a "heartbeat" with the account management server 106. Thus, accordingly, the client device 102 may have a library (not shown) that manages the schedule for a heartbeat process. As part of its heartbeat, the client may provide identity information to the account management server 106. Further, for example, the heartbeat may include information regarding a version of software being used by the client device 102, a last attempted data backup time, an e-mail verification status, an SMS verification status, account state information, an account identity token, and/or a next scheduled heartbeat.

The ping from the client device 102, as packaged dependent on a heartbeat library 336, is received by the heartbeat manager module 312 resident on the account management server 106. Should an update be available for the client device 102, the heartbeat manager module 312 accordingly sends the update to the updater module 340 for processing/executing by the client device 102.

The account management server 106 is operatively connected to or has resident within it a delay times data store 502. The delay times data store 502 includes a collection of configurable and/or default delay times. These delay times, configurable via a delay configuration module 504, are used by the heartbeat manager module 312 to indicate to the client device 102 how and when the client device 102 should send future pings. For example, the response from the heartbeat manager module 312 may include information in its response as to how long the client device 102 should wait before attempting a next ping. If the client is unable to perform a heartbeat at a requested time for some reason, the client may cancel that heartbeat and retry that heartbeat again on some predetermined basis (e.g., daily). Accordingly, by controlling a ping frequency, the account management server 106 may, for example, slow down pings from the client device 102 if the account management server 106 is experiencing high traffic load (e.g., an increased internal or external demand for computing resources).

Further, the response from the heartbeat manager module 312 may include information in its response as to how a next ping from the client device 102 should be sent. For example, the heartbeat manager module 312 may indicate to the client device 102 that a next ping should occur via an SMS message rather than by an HTTP request. In another example, the heartbeat manager module 312 may indicate to the client device 102 that a next ping should be sent via a particular voice channel instead of by an HTTP request. In this manner, for example, heartbeats can be sent from the client device 102 on an alternative network (e.g., a Wi-Fi network) even if an initially selected network (e.g., a mobile phone network) is not available. Thus, in general, a server side component (here, the account management server 106) controls a heartbeat of a client side component (here, the client device 102). Further, by managing the heartbeats of the client device 102 and knowing when to expect heartbeats from the client device 102, the account management server 106 may be used to track whether the client device 102 is functioning and "alive" (e.g., operational and/or active).

In one or more embodiments, the delay time specified in a response to the client device 102 may vary according to carrier, group, device, and/or platform. For example, a delay time in a response to a client device 102 that is part of a first group may be longer than a delay time specified in a response to another client device (not shown) that is part of another group. As described above, delay times may be stored in the delay times data store 502. One or more of these delay times may have default values, and further, one or more of these delay times may be dynamically adjusted based on need and/or performance objectives.

Further, in one or more embodiments, a response from the heartbeat manager module 312 may indicate to the client device 102 an event trigger that should cause the client device 102 to send out a heartbeat. For example, the heartbeat manager module 312 may indicate that when the client device 102 sends an outgoing e-mail, the client device 102 at that time should also send a heartbeat to the account management server 106. In another example, the heartbeat manager module 312 may indicate that the client device 102 should send out a heartbeat whenever an SMS message is sent from the client device 102.

When an update is indicated as being available, the client may ask the user if he/she wishes to download and install the update. For example, the client may notify the user via an alert that leads the user to an application dialog. Further, in one or more embodiments, if an update is detected, the client may disallow attempts to perform additional server activities until the update is installed. Moreover, if an update is available, the client may ask the user if he/she wishes to download and install the update immediately or be reminded to download the update at a later time. If the user chooses to download and install the update immediately, the client may download and install the update in the background (e.g., the user may still use a phone functionality of the client device 102 without being interrupted). If the user chooses to be reminded of the update at a later time (e.g., after a certain number of days have passed), the client may re-prompt the user at that time. Further, for example, after providing a particular number of reminders, the client may inform the user that the user will not be reminded again and that the user will need to download and install the update manually. Moreover, in one or more embodiments, the client may provide a preference setting to allow future updates to be downloaded without prompting the user.

Web Applications Server

Figure 6:
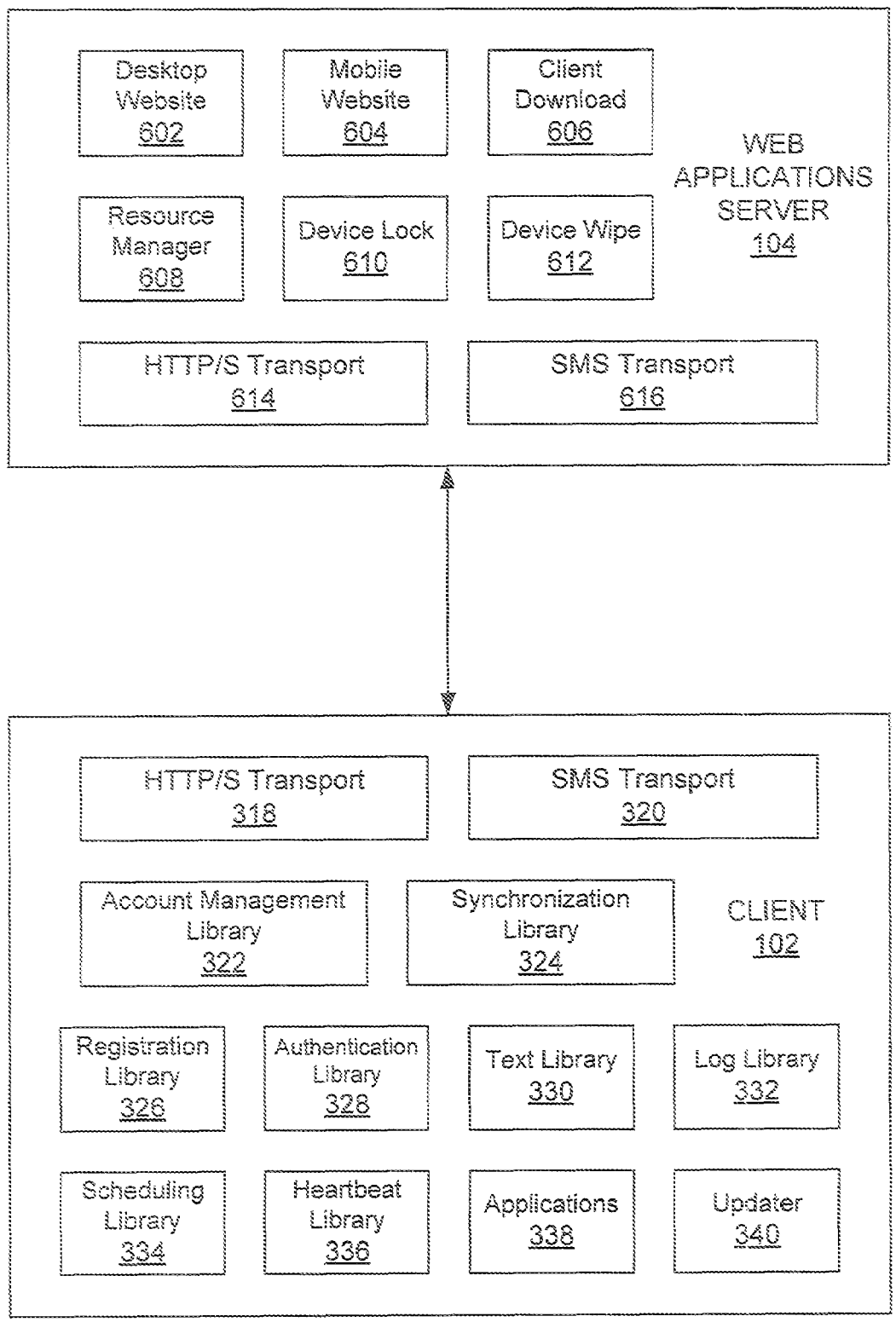
FIG. 6 shows a module-level diagram of a web applications server and a client-side computing device in accordance with an embodiment of the present invention.

FIG. 6 shows a diagram of the web applications server 104 and the client device 102 in accordance with an embodiment of the present invention. The web applications server 104 may host a desktop website 602 and/or a mobile website 604 for providing information regarding a product, service, and management suite offered by system 100 to a user of the client device 102. In other words, an entity, such as a service provider, device manufacturer, and/or retailer, may rely on the desktop website 602 and/or the mobile website 604 to publicly convey information regarding products and/or services offered by system 100.

The web applications server 106 also includes an HTTP/S transport component 614 and an SMS transport component 616 for respectively interfacing with the HTTP/S transport component 318 and the SMS transport component 320 resident on the client device 102. These transport components 614, 616, 318, 320 may support, for example, any one or more of the various communications supported between the client device 102 and the account management server 106.

In order for the client device 102 to have the functionality described herein, it may be necessary for the client device 102 to have appropriate client software installed. In one or more embodiments, the user may access one of the desktop website 602 and/or the mobile website 604. The user enters their mobile phone number and carrier and requests the client software (see, e.g., FIG. 20). In turn, the user receives an SMS message on the client device 102, where the SMS message may include a web link to a mobile download page (see, e.g., FIG. 21), possibly supported by a client download module 606 resident on the web applications server 104. The user may then click on the web link and the user's mobile browser is launched. The user may then be taken to a mobile download site that detects the client device's 102 operating system and begins the download of the appropriate client installer (see, e.g., FIGS. 22 and 23). The client installer runs on the client device 102 upon download (see, e.g., FIG. 24). Then, the client is initiated after installation and registration/login as described above begins.

Further, in one or more embodiments, the client may be installed via a storage device having stored therein client software available for installation. For example, in one or more embodiments, the storage device may be a secure digital (SD) card. In such a case, the user may be provided with a secure digital card that contains a client installer for an operating system of the client device 102. The user then inserts the secure digital card into the client device 102, and the client device 102 in turn performs the appropriate installation. Upon the installation, the client launches and the user may be prompted to perform registration/login as described above.

Still further, in one or more embodiments, the client may be downloaded and installed via a mobile website. In such a case, the user may open a web browser on the client device 102. The user may then navigate to the appropriate website for downloading the client. The user may then choose to begin the download of the client. Moreover, in one or more embodiments, the mobile download page may detect the operating system of the client device 102 and deliver the appropriate client installer. The client installer may then run on the client device 102 after download. The client is then accordingly installed and registration/login as described above begins.

As described above, the web applications server 104 may convey product and/or service information regarding system 100. Further, the web applications server 104 may facilitate distribution of a client installer via an SMS message. Further still, the web applications server 104 may provide an interface for the user to submit the user's mobile phone number and carrier. Still further, the web applications server 104 may include a mechanism to prevent malicious users from sending repeated SMS messages.

As described above, once the user has entered a mobile phone number and carrier, the web applications server 104 may send an SMS message to the client device 102, where the SMS message includes a link to a mobile landing site. In one or more embodiments, the web applications server 104 may utilize an SMS aggregator (not shown) to send SMS messages. After an SMS message is sent, the web applications server 104 may provide the user with information about the next steps the user will be taking—receiving the SMS and performing the client installation process.

In one or more embodiments, the mobile website 604 may be able to determine an operating system of the client device 102. The mobile website 604 may provide direct download of the appropriate client installer for the client device 102 via a mobile download site. Further, the mobile website 604 may provide a mobile download site to deliver a mobile download and to serve as the destination for SMS links sent to users from the desktop website 602. Moreover, in one or more embodiments, the mobile download site may automatically begin download of an appropriate installer to the client device 102. In such cases, the mobile download site may detect the operating system of the client device 102.

Further, in one or more embodiments, the client application and related component files may be delivered in the form of a self-extracting client installer that can be executed on the client device 102. More particularly, in one or more embodiments, the client installer may check for sufficient memory on the client device 102 before performing installation. Further, the client installer may check to make sure the client device 102 is a supported device type. Still further, the client installer may detect which components are already on the client device 102 and may not overwrite any user information or pre-existing client components unless particular components are being upgraded. Moreover, as described above, the client installer may be able to run, for example, from either the client device 102 or from a storage device (e.g., a secure digital card). Additionally, the client installer may auto-delete itself from the client device 102 (but not from the storage device) after successful installation.

Figure 7:
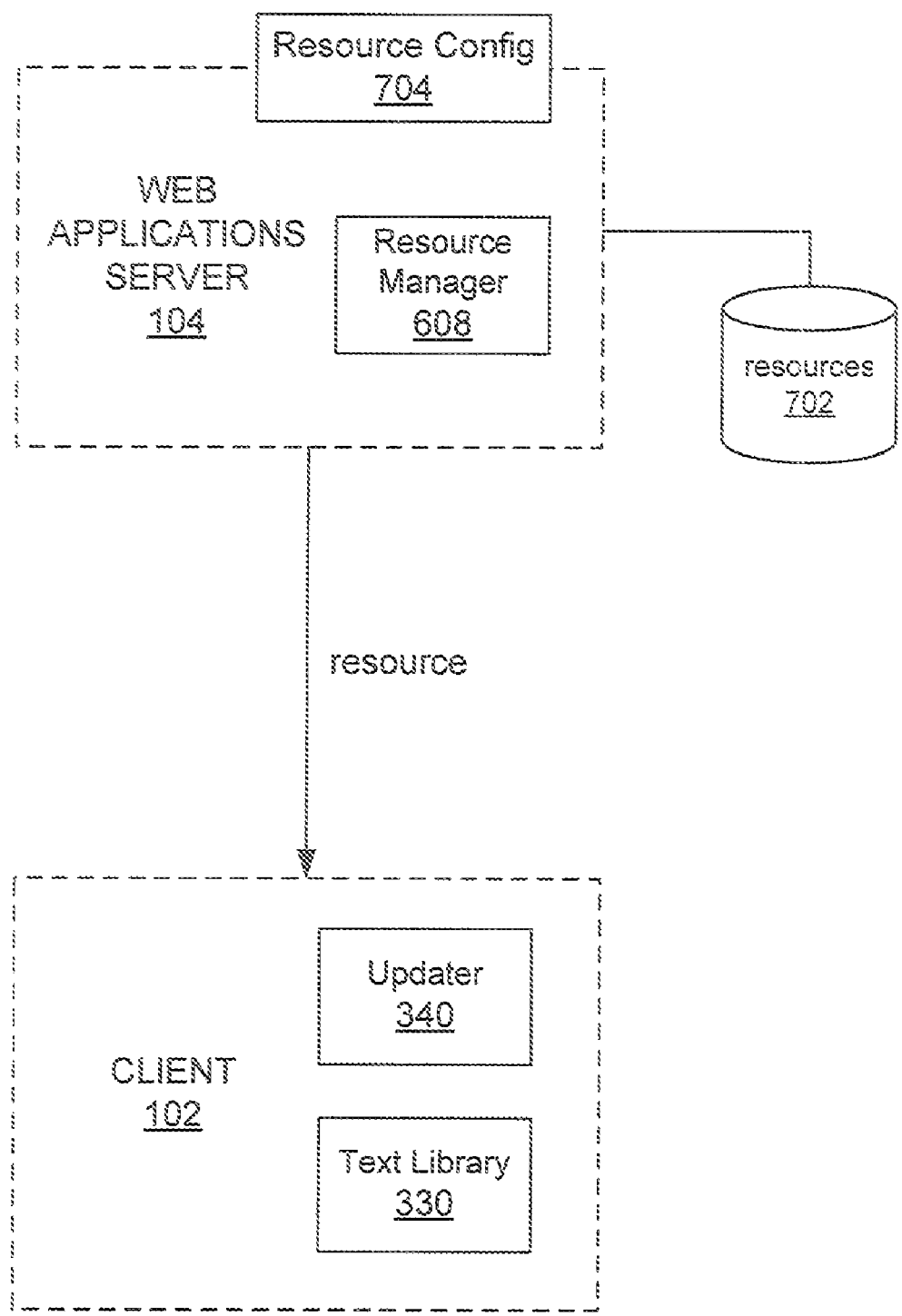
FIG. 7 shows a subsystem of an over-the-air device services and management system in accordance with an embodiment of the present invention.

Still referring to FIG. 6, the web applications server 104 includes a resource manager module 608. FIG. 7 shows a subsystem associated with the resource manager module 608. In general, resource management, as described below, facilitates one or more services by which data resources referenced by software applications resident on client devices served by system 100 may be updated at the server level and broadcasted out to the client devices based on, for example, device type, carrier, and/or group.

The web applications server 104 is operatively connected to, or has resident within it, a resources data store 702. The resources data store 702 includes resources, such as, for example, text strings, bitmaps, codes, images, character strings, and/or metadata, that may be used in connection with applications or user interfaces on the client device 102. In general, a resource is any form of static data.

During use and operation of the client device 102, particular errors or unknown situations may occur. When such an error or unknown situation occurs, the user of the client device 102 may register the error with a server-based component. For example, the user may access a help desk or provide quality assurance feedback. The user provided information may then be made available to an administrator (or operator or customer service agent) having access to the resource configuration module 704 shown in FIG. 7. The administrator may then make a determination as to whether the error indicated by the user is a frequently occurring one and/or one that is significant relative to other types of errors. The administrator may also map the error to a particular resource stored in the resources data store 702.

On some regular or periodic basis (e.g., based on some scheduled process), the resource manager module 608 may auto-generate a resource bundle for deployment to the client device 102 (and to other client devices). In this way, the resource bundle is auto-generated to include resources that are frequently referenced. In other words, the resource bundle may be auto-generated to include "must-have" resources for the client device 102. The resource file may be sent to the client device 102 over-the-air via, for example, an SMS message. Those skilled in the art will note that such an auto-generate resource file build and send mechanism obviates the need for the client device 102 to be shipped or initially installed with a multitude of resource-consuming resources (generally including text, graphics, user interface headings, or anything else that may be capable of being displayed), some of which may not subsequently be needed by the client device 102. Thus, at least in one aspect, resources get added to the client device 102 on an "as-needed" basis.

When a resource file from the resource manager module 608 is received over-the-air at the client device 102, an updater module 340 is triggered to be notified that an update is available. The updater module 340 then takes the resource file and installs into the text library 330, so that when the client device 102 subsequently throws an error (of a type previously experienced), a resource corresponding to that error is available for use in the text library 330.

Figure 8:
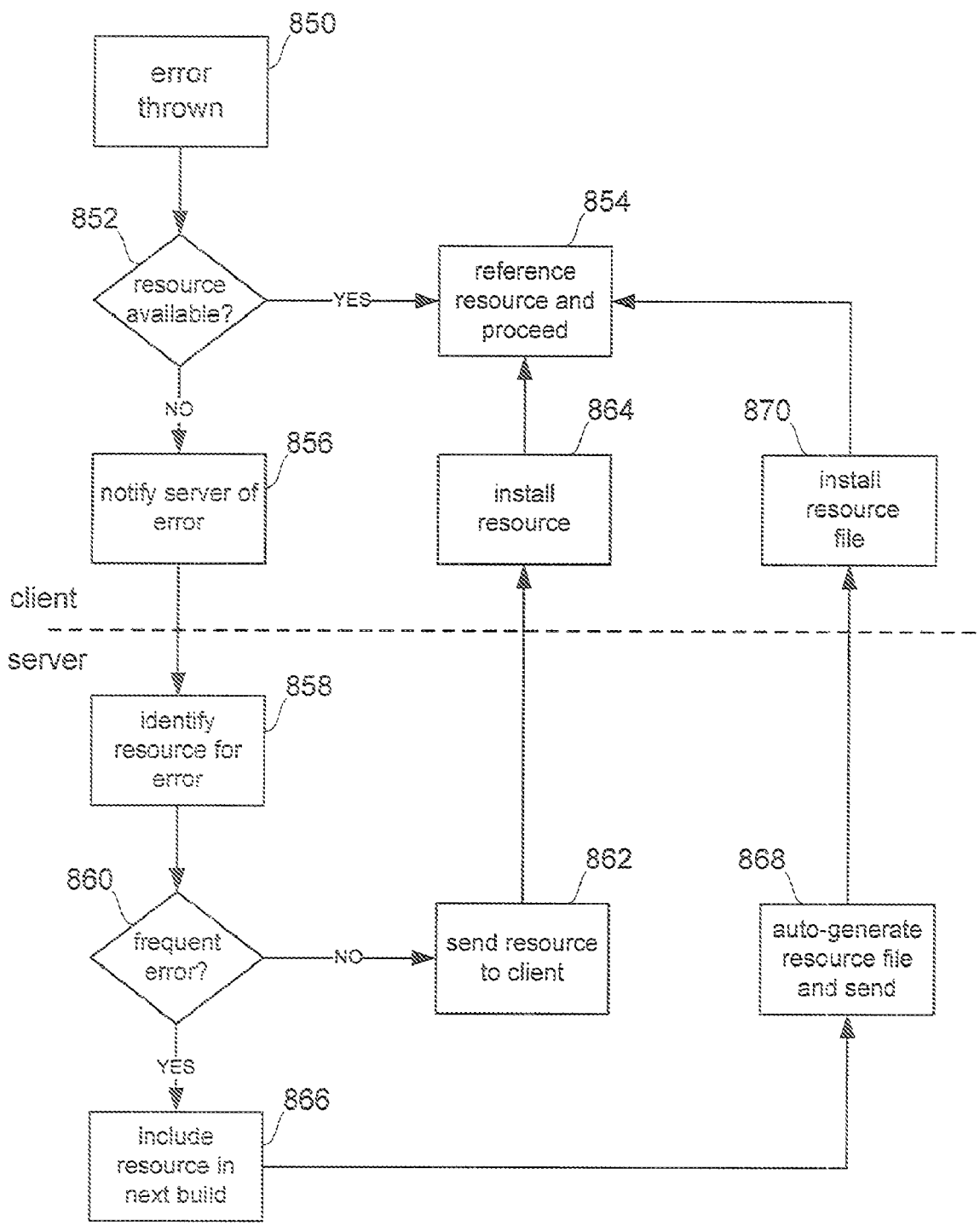
FIG. 8 shows a flow process in accordance with an embodiment of the present invention.

FIG. 8 shows a flow process of a resource management process in accordance with an embodiment of the present invention. The process begins when, at the client, an error is thrown 850. If a resource is locally available for that error (determined, for example, via reference to text library 330) 852, then the client operation proceeds with referencing that resource 854.

If a resource for a thrown error is not available 852, the occurrence of that error is notified to the server 856. Such notification may occur via one or more of various mechanisms. For example, the user may send an e-mail or SMS message notification of the error. In another example, the user may access a particular web page to register the error with an administrator.

Once notification of the occurrence of the error is received at the server level, the resource(s) mapping to that error is/are identified 858. If the error is one not determined by the server as frequently occurring 860, those resources mapped to the received error may be sent to the client 862, whereupon the client installs the received resources 864 and client operation proceeds with referencing the appropriate resource(s) 854. However, if the error is determined as frequently occurring 860, the server marks the appropriate resource(s) to be included in a next resource file build 866. Then, at the appropriately scheduled time, the resource file is auto-generated 868 and sent to the client, whereupon the client installs the resource file 870 and client operation proceeds with referencing the appropriate resource(s) 854.

Referring again to FIG. 7, in one or more embodiments, the client device 102 may perform an "on-demand" resource fetch. For example, if there is a continuous or frequent occurrence of a particular type of error, the client device 102 may, via the resource manager module 608, retrieve the appropriate resource(s) from the resources data store 702. In other words, the client device 102 may keep track of how many times a particular type of error occurs without being in a resource file build sent from the resource manager module 608. Upon reaching some threshold of occurrences of that error, the client device 102 demands and obtains the appropriate resource(s) from the resources data store 702. Further, when retrieving the resource, that resource may be "marked" as being frequently used, so that the resource is included in a next auto-generate of a resource file.

Moreover, in one or more embodiments, the client device 102 may fetch a resource and not mark the resource as being frequently used. In such a case, that resource may be monitored for how often it is requested/fetched, and an alert may be sent to an administrator if a trend of requests for the resource indicates that that resource should be included in a next resource file build. Further, those skilled in the art will note that in one or more other embodiments, the process of monitoring resource request trends and determining whether to include the resource in a resource file build may be automated.

Further, the resources in the resources data store 702 may be customized according to, for example, carrier, group, device type, and/or application suite. For example, should the client device 102 belong to a certain group regarding as having lower computer proficiency than another group, then a resource associated with an error message may be adjusted to provide more detailed error instructions as opposed to for the other group regarded as having higher computer proficiency. Thus, in such a manner, error codes may be dynamically mapped to particular resources.

Figure 9:
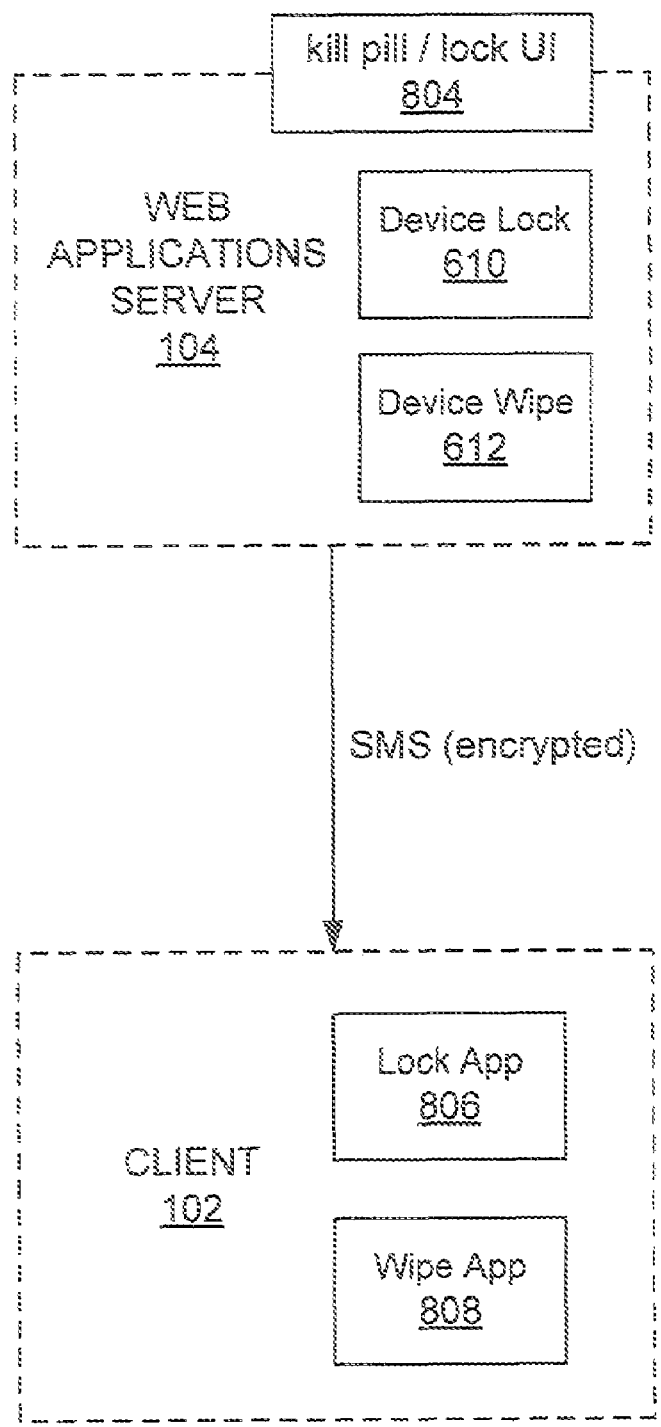
FIG. 9 shows a subsystem of an over-the-air device services and management system in accordance with an embodiment of the present invention.

Referring again to FIG. 6, the web applications server 104 includes a device lock module 610 and a device wipe module 612. FIG. 9 shows a subsystem associated with the device lock module 610 and the device wipe module 612. In general, these modules 610, 612, along with the counterpart modules on the client device 102 further described below, facilitate "kill pill & lock" services provided by system 100. The availability of one or more of these services may be helpful, for example, if the user loses, misplaces, or is otherwise away from the client device 102. There may be user data on the client device 102 which the user wants to restrict access to in a situation where the user is not in possession or direct control of the client device 102. Thus, in such cases, the "kill pill & lock" services further described below allow the user to remotely restrict accessibility to user data stored on the client device 102 without having to fully deactivate the client device 102 or disable an account associated with the client device 102. Examples of user data include calendar data, contact data, task data, memo data, browser bookmark data, phone application shortcut data (e.g., speed dial number data), call log data, application settings data, and SMS message history data.

Once the user completes registration as described above, the user may be informed that the client device 102 is now activated for kill pill & lock service. A remote device lock may be performed by using the device lock module 610 via a kill pill & lock user interface 804. To do so, in one or more embodiments, the user (or an administrator) may access the desktop website 602, enter their phone number and account password, and choose a device lock option. The user may be provided with an option to send down a message to the client device 102, where this message may then be displayed whenever someone tries to access the client device 102. The "lock down" command is sent to client device 102, and the web applications server 104 waits for a confirmation. When a lock application 608 on the client device 102 receives the lock down command, the password for the client device 102 is set to the account password and the client device 102 is then locked. In other words, for example, when the lock application 608 receives the lock down command, the command is executed, the result of which is to lock down user data on the client device 102 from being accessible through use of the client device 102.

If no confirmation that a lock down command has been successfully executed is received by the web application server 104 after a certain time period, the lock down command may be resent. If still not successful after a number of retries, an e-mail is sent to the user indicating failure to lock down the client device 102. On the other hand, if successful, the user receives a confirmation e-mail.

Moreover, in one or more embodiments, if a confirmation of successful lock down command execution is not received by the web applications server 104, the web applications server 104 may request the account management server 106 to continuously broadcast messages to the client device 102 to increase a ping frequency of the client device 102 (as described above). When the client device 102 receives these signals from the account management server 106 and a next ping is received from the client device 102, the lock down command may then be immediately sent to the client device 102 for execution. In such a manner, as soon as the client device 102 is visible to the network, a lock down command may be sent to the client device 102. Thus, even if the client device 102 is "off-line" for period of time, a lock down functionality may still be invoked as soon as the client device 102 goes "on-line".

Further, a remote kill pill may be sent using the device wipe module 612 via the kill pill & lock user interface 804. In this case, the user (or an administrator) goes to the desktop website 602, enters their phone number and account password, and chooses a kill pill option. The user may be asked to confirm his/her decision to send the kill pill and may be provided with an option to initiate a remote data backup before the kill pill is sent. The kill pill is sent to the client device 102, and then a wipe application 808 on the client device 102 erases all (or at least a portion of) the user data on the client device 102 and returns the client device 102 to factory settings even if, for example, a requested data backup is not successful as per user preferences. Further, for example, once a kill pill command is received by the wipe application 808, the user data may then be erased regardless of whether the client device 102 is connected to a service network. In this manner, once a kill pill is received, kill pill execution may not be stopped by disconnecting the client device 102 from the network (e.g., network 202 in FIG. 2).

If no confirmation that a sent kill pill command has been successfully executed is received by the web applications server 104 after a certain time period, the kill pill may be resent. If still not successful after a number of retries, an e-mail may be sent to the user indicating a failure to successfully deploy the kill pill. On the other hand, if successful, the user receives a confirmation e-mail.

Further, in one or more embodiments, if a confirmation of successful kill pill command execution is not received by the web applications server 104, the web applications server 104 may request the account management server 106 to continuously broadcast messages to the client device 102 to increase a ping frequency of the client device 102 (as described above). When the client device 102 receives these signals from the account management server 106 and a next ping is received from the client device 102, the kill pill command may then be immediately sent to the client device 102 for execution. In such a manner, as soon as the client device 102 is visible via the network, a kill pill may be sent to the client device 102. Thus, even if the client device 102 is "off-line" for period of time, a kill pill functionality may still be invoked as soon as the client device 102 goes "on-line".

In one or more embodiments, the lock down command and/or the kill pill described above may be sent to the client device 102 in accordance with a configuration of the client device 102. For example, the lock down command and/or the kill pill may be sent in accordance with an operating system of the client device 102. In another example, the lock down command and/or the kill pill may be sent in accordance with a type of the client device 102. By generating the lock down command and/or the kill pill according to one or more particulars of the client device 102, proper recognition and execution of the lock down command and/or the kill pill may be achieved.

As to the device lock module 610 and the device wipe module 612 hosted on the web applications server 104, the corresponding desktop website 602 may only allow the user to perform a kill pill & lock function if the user's account is active (in State B or C). If the user's account is not in State B or C, the desktop website 602 may display a login error message and not allow the user to perform a kill pill & lock function.

Further, the desktop website 602 may provide a user interface 804 for issuing kill pill & lock commands. As described above, to do so, the desktop website 602 may require the user to enter an account phone number and password. The desktop website 602 may authenticate the user's phone number and account password before sending out a lock down command or kill pill.

Moreover, in one or more embodiments, the desktop website 602 may allow "re-locking" of the client device 102 with a new password (if device is already locked, the user may be able to reset the password via e-mail and then re-lock the client device 102 with the new password).

As apparent from the description above, the desktop website 602 may allow the user to choose between a kill pill or lock down command to send to the client device 102. For security purposes, in one or more embodiments, the desktop website 602 may not allow the user to issue if a kill pill if the user's password has been reset within a predetermined period of time (e.g., 24 hours). Further, in one or more embodiments, device locking may always be allowed regardless of a time of a last password change.

In one or more embodiments, the kill pill or lock down command may be sent as an (encrypted) SMS message propagated through an SMS aggregator gateway (not shown). The desktop website 602 may include information in the SMS message sent to the client that allows the client to authenticate the request. Further, the desktop website 602 may require the user to confirm before sending a kill pill and may remind the user of the effects of the kill pill.

When the user requests a device lock, the desktop website 602 may allow the user to enter a message to be displayed on the client device's 102 lock screen. When the user requests a device lock, the desktop website 602 may allow the user to enter a phone number to be transmitted to the client device 102, whereupon that phone number may be displayed on the device lock screen in an effort to instruct an individual accessing the client device 102 to call that phone number (see, e.g., FIG. 28).

As described above, the web applications server 104 may resend lock down commands and kill pills to the client device 102 if the web applications server 104 does not receive a success message from the client device 102. In one or more embodiments, the web applications server 104 may, for example, have the following retry schedule: 1st retry—1 minute; 2nd retry—5 minutes; 3rd retry—30 minutes; 4th retry—2 hours; 5th retry—6 hours; 6th retry—12 hours; and 7th retry—24 hours. If all retries fail, the web applications server 104 may notify the user by sending an e-mail to the user's account e-mail address.

Further, in one or more embodiments, when requesting a kill pill, the user may have the option to request a data backup before execution of the kill pill. The user may be provided with an option to specify if the kill pill should continue even if the data backup is not initially successful. When requesting a device lock, the user may be provided with an option to request device backup as part of the lock down command. For example, the client device 102 may be locked down and user data on the client device 102 may then be wirelessly transmitted to a remote data store. Thereafter, the client device 102 may also be "killed" (e.g., user data erased as described above) while in the locked state. In this manner, locking the client device 102 prevents an individual in possession of the client device 102 from trying to circumvent or prevent a lock down, data backup, and/or kill pill operation. Upon receiving confirmation from the client device 102 of a successful device lock or kill pill, the web applications server 104 may send an e-mail to notify the user of the specific action(s) taken.

If an SMS message is confirmed delivered but no confirmation message is received from the client device 102 after a certain period of time, the web applications server 104 may notify the user via e-mail that the SMS message was received but no device confirmation was received.

In regard to a kill pill as used in one or more embodiments, the wipe application 808 may be able to receive and process a specially-formatted SMS message to initiate kill pill activity. Further, the wipe application 808 may authenticate the kill pill using information provided by the web applications server 104 in the SMS message. Moreover, upon receiving the SMS message, the client may initiate a data backup if the user has chosen to do so. During the backup process, if the backup fails due to any errors or is canceled manually, the client may still execute the kill pill command. When performing a kill pill function, the client may delete applications and data on the client device 102 by, for example, writing over the contents in memory and then doing a hard reset back to factory default settings. After the kill pill has been executed and the client device 102 has been hard-reset, the client may re-lock the client device 102 with his/her account password. Also, the client may notify its status to the web applications server 104 before the final kill pill procedure begins. If the client is unable to contact the web applications server 104, the client may continue with the kill pill process if the user has indicated such a preference when sending the kill pill.

In regard to device locking, the client may be able to receive and process a specially-formatted SMS message to initiate a device lock function. The lock application 806 may authenticate the device lock request using information provided by the web applications server 104 in the SMS message. Upon receiving the SMS message, the client may initiate a data backup if the user has chosen to do so. Further, upon receiving the SMS message, the client locks the client device 102. Moreover, the lock application 806 may render on a display of the client device 102 a message indicating that the client device 102 is locked. The client may not allow a user to bypass the display screen without entering the correct password (see, e.g., FIG. 28). Particularly, the client may allow a user to enter an account password to unlock the client device 102. Further, if the web applications server 104 has transmitted a user-specified custom message, the client displays that message on the lock display screen. Still further, if the web applications server 104 has transmitted a user-specified phone number, the client may allow the user to call that phone number with the client device 102 (see, e.g., FIG. 28). More particularly, in one or more embodiments, that phone number may not actually be displayed to the caller. Moreover, the client may allow the client device 102 to be used to dial emergency services (see, e.g., FIG. 28).

Figure 10:
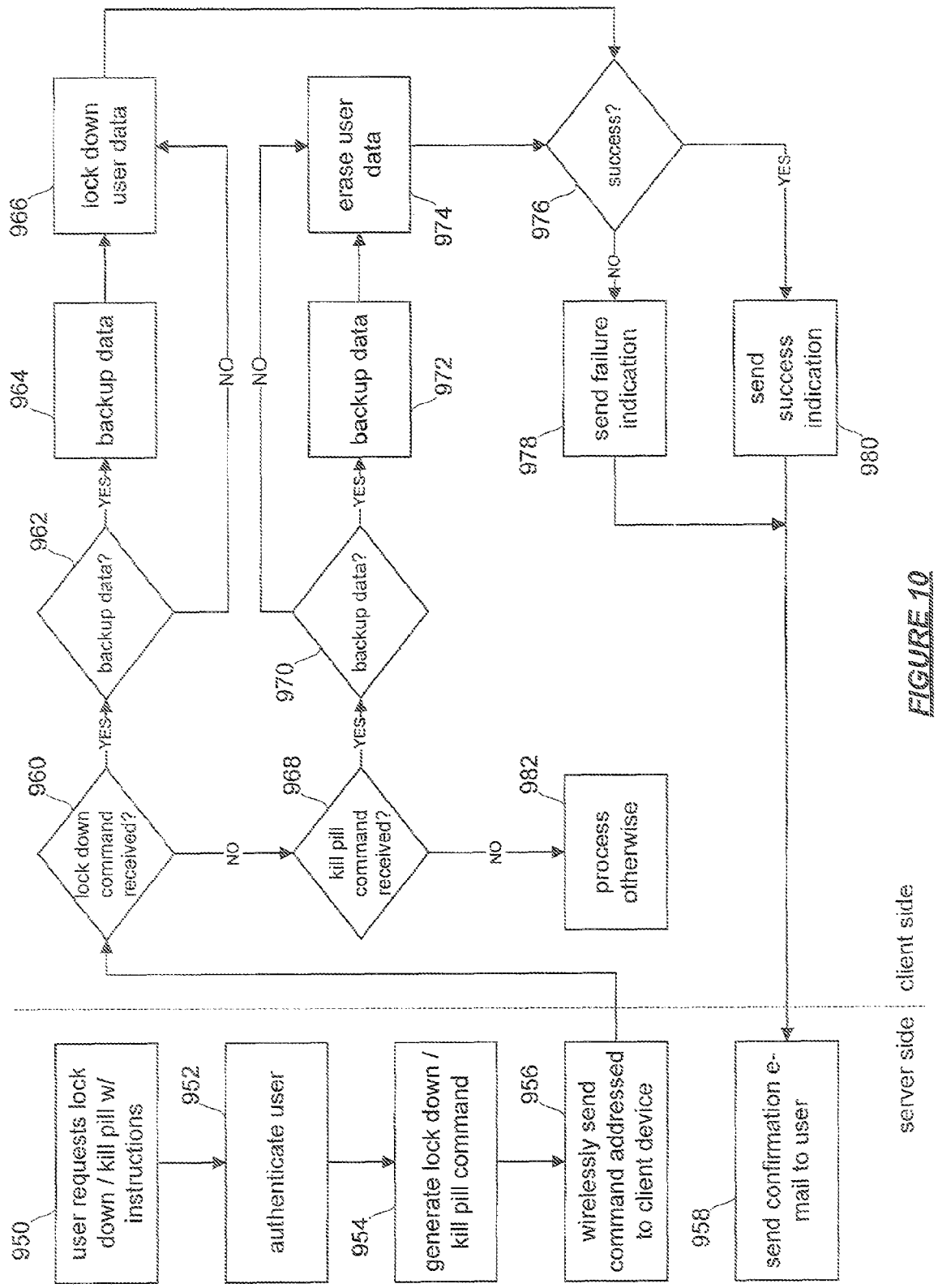
FIG. 10 shows a flow process in accordance with an embodiment of the present invention.

FIG. 10 shows a flow process in accordance with an embodiment of the present invention. Particularly, a flow process for exemplar kill pill & lock services is shown. On a server side (e.g., web applications server 104), a user requests a lock down or kill pill command be sent to his/her client device (e.g., client device 102) 950. Along with the request, the user may specify particular instructions. Examples of additional instructions that may be requested include whether to perform a data backup before a kill pill operation is executed, whether to perform a data backup before a lock down operation is executed, a phone number to call should an individual attempt to use a phone functionality of the client device, and whether to remove a lock on user data on the client device after a predetermined amount of time.

As or after the request and instructions from the user are received, the server side attempts to authenticate the user using credentials provided by the user 952. Such authentication may involve locating a user account for the client device. Assuming that the requesting user is authenticated, the server side accordingly generates a lock down command or a kill pill command 954. The command may be generated in accordance with a specification of the client device as referenced in the user account located via authentication of the user. In other words, the command may be generated particularly for the intended client device.

The lock down or kill pill command is then wirelessly transmitted from the server side to an address of the client device 956. Upon wireless reception at the client device, the client device decrypts the command and makes a determination as to whether the command is a lock down command 960. If a lock down command has been received 960, the client device determines whether an instruction has been provided to perform a data backup prior to locking down the client device 962. It is noted that in one or more other embodiments, a data backup may be invoked systematically without particular request from the user. If data backup is required or requested, the user data on the client device is wirelessly backed up to a remote data store 964. Thereafter, the client device locks down the client device so that user data on the client device is restricted from being accessible using the client device 966.

Should the client device receive a kill pill command 968, the client device may automatically lock itself as described above (noting that should the received command not be a lock down command or kill pill command, the command is processed otherwise 982). The client device determines whether an instruction has been provided to perform a data backup prior to erasing user date on the client device 970. It is noted that in one or more other embodiments, a data backup may be invoked systematically without particular request from the user. If data backup is required or requested, the user data on the client device is wirelessly backed up to a remote data store 972. Thereafter, the client device erases user data on the client device 974.

It is important to note that in one or more embodiments, a kill pill or lock command may be sent to a client device from web applications server 104 even though that client device may not synchronize data via the web application server 104. In other words, the ability to send a kill pill or lock command is not limited by the synchronization engine(s) used by the client device 102 to synchronize data. For example, in one or more embodiments, kill pill and lock command functionalities may be supported, specific, and/or dependent on a device maker as opposed to a third party vendor offering data synchronization solutions for the device.

Further, in one or more embodiments, the user may choose what data is to be locked or killed. For example, the user may request that only critical data be erased as opposed to all user data. In another example, the user may allow certain types of data to remain unlocked while specifying other types of data to be locked as part of the user-initiated lock operation.

If the lock down or kill pill operation is successful 976, the client device wirelessly sends a success indication to the server side 980. Otherwise, the client device wireless sends a failure indication to the server side 978. The server side then notifies the user accordingly 958. Notification to the user may be provided, for example, via e-mail, automated message to a stored home or work phone number, postal mail, or a website accessible to the user.

Synchronization Server

Figure 11:
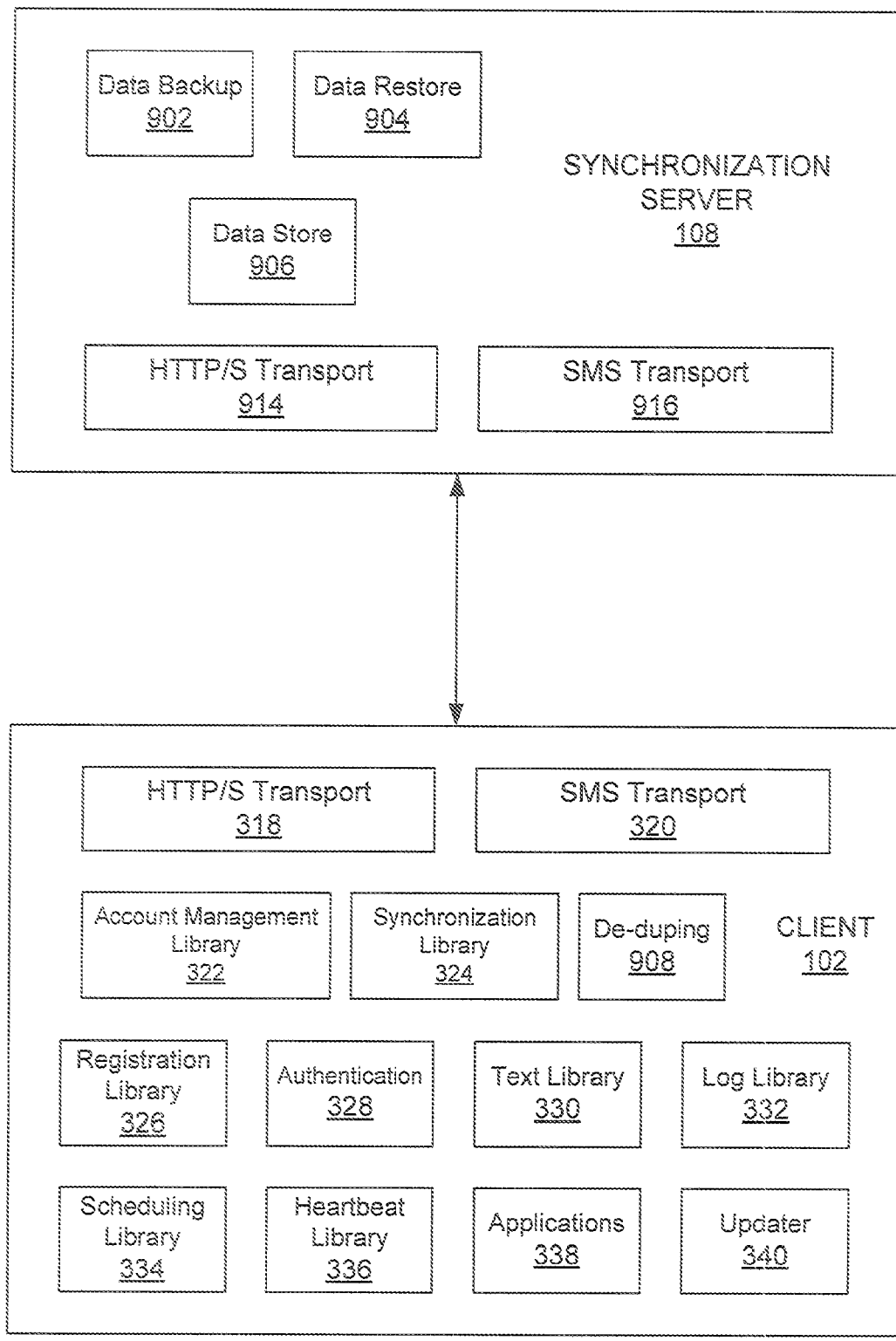
FIG. 11 shows a module-level diagram of a synchronization server and a client-side computing device in accordance with an embodiment of the present invention.
Figure 12:
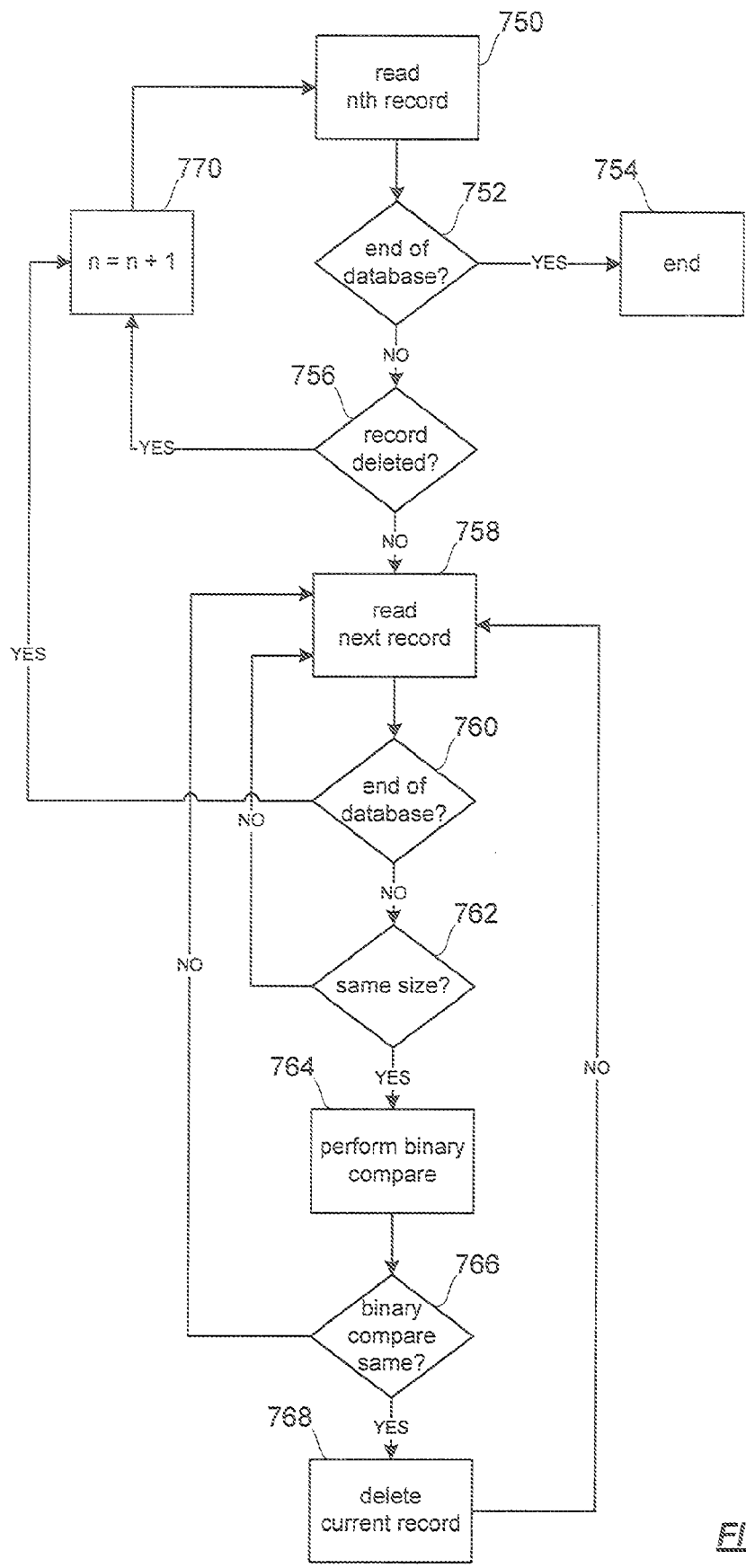
FIG. 12 shows a flow process in accordance with an embodiment of the present invention.
Figure 14:
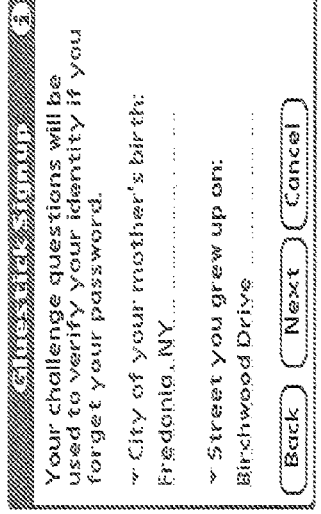

FIG. 11 shows a diagram of the synchronization server 108 and the client device 102 in accordance with an embodiment of the present invention. The synchronization server 108 includes a data backup module 902, a data restore module 904, and a data store 906, each of which is further described below.

The synchronization server 106 also includes an HTTP/S transport component 914 and an SMS transport component 916 for respectively interfacing with the HTTP/S transport component 318 and the SMS transport component 320 resident on the client device 102. These transport components 914, 916, 318, 320 may support, for example, any one or more of the various communications supported between the client device 102 and the account management server 106 (or web applications server 104). Further, for example, data backup and restore operations between the client device 102 and the synchronization server 108 may occur using synchronization markup language (SyncML) messages sent over HTTP/S. Moreover, in one or more embodiments, data backup and restore operations between the client device 102 and the synchronization server 108 may occur using a Public and Private Information (PAPI) based protocol over HTTP/S.

The data backup module 902, the data restore module 904, and the data store module 906 support data backup and restore services provided by system 100. As described above, upon the user completing registration, the user is presented with an option to do a backup of data on his/her client device 102. If the user chooses to initiate a data backup, the user may be informed how long the data backup will take and how much data traffic will be incurred. If the user approves, the data backup is initiated and a data backup progress indicator may be displayed with a cancel option (see, e.g., FIG. 25). The particular data that is backed up may vary. Upon successful completion of the data backup, the user is informed accordingly (see, e.g., FIG. 26).

Further, in one or more embodiments, the user data may be automatically backed up according to a particular schedule.

Further still, in one or more embodiments, the user data may be backed up on "as-needed" basis. Moreover, the user may manually initiate a data backup. In such cases, the user may make changes to particular data on the client device 102 and choose to perform a data backup on the changed data. In other words, in one or more embodiments, incremental changes in user data may be backed up instead of all of the user data resident on the client device 102.

In some cases, the user may restore data to a clean client device (e.g., a new device) with data backed up from a previously used client device. This occurs by the user logging in to an existing account on their new client device. The synchronization server 108 may then detect that the user has previously backed up data to the synchronization server 108. The client then offers the user the option to initiate a restore. The user may then initiate the restore, whereupon the user is informed of the time and data usage before restore begins. Restore is then initiated, and a restore progress indicator may be shown. Target data is then restored to the client device 102. Moreover, in one or more embodiments, data existing locally on the client device 102 is merged with the data stored on the synchronization server 108. After the restore is completed, the user is informed of the successful data restore.

In some cases, the user may migrate to a newer generation client device having the same operating system as the previously used client device. Here, the user performs a data backup on the old device. The user may then acquire and install client software on the new client device as described above. The data backed up may then be restored to the new device.

The types of data that may be backed up and then subsequently restored include, for example: a calendar; contacts; tasks; memos; browser bookmarks; phone application shortcuts, including speed dial numbers; call logs; application settings; and SMS message history.

Figure 27:
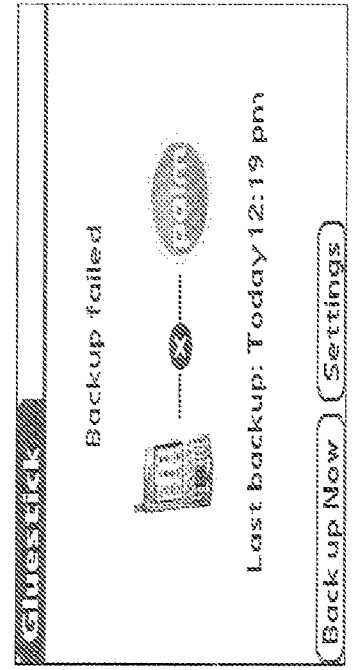

FIG. 27 shows an example of a data backup screenshot in accordance with an embodiment of the present invention. The client may display a time and date of a last successful backup and any error condition if necessary. When the user elects to perform a data backup, if the user has not performed a restore to the client device 102 (because the client was last newly registered or logged in), the client may before a purge then perform a data backup (a "clean backup"). When the client performs the clean backup, the previously backed up data on the synchronization server 108 may be purged and replaced by the more recently backed up data. Further, if data exists on the synchronization server 108, the client may warn the user that existing data will be overwritten.

Further, as described above, the client may perform incremental backups. If the user has already performed a backup or restore on the client device 102 (since the client was last newly registered or logged in), the client may perform an incremental backup. During the incremental backup, the client may only backup data that has been changed since it was last backed up to or restored from the synchronization server 108. Further, the client may backup data changes at the field level, rather than at a record or database/file level.

Moreover, in one or more embodiments, user-initiated backups may disable other device activities that may interrupt the data backup. If a data backup times out, an error message may be displayed other device previously stopped activities may be (re-) enabled. Further, the user may be prevented from leaving a backup application. The user may be offered a cancel option that provides instant cancellation of an ongoing backup and (re-) enables other previously stopped device activities.

In one or more embodiments, an automated backup may be performed after the client device 102 has been dormant for some amount of time. If a data backup is interrupted, the data backup may auto-cancel instantly and hand over control to a requesting application or a default application (if there is no requesting application). If the data backup is auto-canceled, the client may re-attempt background backups.

Further, in one or more embodiments, data backups may be performed in a non-blocking thread. If the client is the active application during a data backup, the client may display progress information to the user including the type of data currently being backed up and an overall completion percentage. Moreover, the client may be able to continue a data backup even if target data is changed by the user during the data backup. Still further, in one or more embodiments, the user may be able to initiate an outbound phone call or receive an inbound phone call when a data backup is being performed. Also, the user may be able to initiate data activity when a data backup is being performed. In such cases, the data backup may be canceled and the client may retry the data backup at a later time. Additionally, the user may be able to cancel a data backup process from within the client.

As described above, the user may initiate a manual data backup. For example, the client may inform the user of a projected time and data usage for backup activity before activity begins and may give the user an option to cancel. If the client is performing a manually-initiated initial backup (i.e., the user did not do a data backup when first registering), the client may present the user with a backup schedule configuration screen.

Further, in one or more embodiments, the client may be able to initiate automated backups. Automated backups may be performed based on a user-configurable schedule. If the user has not already performed an initial backup, an automated backup may not be performed. Moreover, automated backups may be performed, for example, "after any change", daily, weekly, monthly, or never as specified by the user. If the user selects "after any change", the client may attempt to perform an automated backup whenever particular data is changed. Additionally, the client may wait until the client device 102 is inactive before attempting an "after any change" data backup. Such data backups may not be performed more than once in a particular time period. Data changes performed during this waiting period may be batched and performed when the waiting period is over. If the user does not select "after any change" or "manual", the client may attempt to perform automated backups during a random time (based on local device time) within a time frame specified by the user's "time of day" preference: "morning" is 6 am-12 pm; "afternoon" is 12 pm-6 pm; "evening" is 6 pm-12 am; and "overnight" is 12 am-6 am. Further, automated backups may be attempted on a schedule regardless of whether the user has performed additional manual backups. Moreover, automated backups may only be performed when the client device 102 has gone into a sleep mode and has been sleeping for a particular amount of time.

Moreover, in one or more embodiments, the client may provide the user with one or more of the following user-configurable settings for automated backup: "after any change"; "once per day"; "once per week"; "once per month"; and "manual". If the user has never performed a data backup, a "manual" selection may be the default setting. Further, the user may be prompted during an initial backup with an option to set a backup schedule to "automated"—the default automated value may be set to "daily". When automated backup schedule is set to "daily", "weekly", or "monthly", an additional "time of day" preference may be made available. Possible values may include, for example, "morning", "afternoon", "evening", and "overnight", where a default setting may be set to "overnight". Additionally, preference options may include a "do not backup when roaming" option, where the default setting may be set to leave this option unchecked. Further, this preference may only be applicable for an automated backup and not a manual backup.

Further, in one or more embodiments, the client may indicate a general data backup state on a main screen using a visual characteristic (e.g., a colored icon). For example, the client may use a green icon to indicate the user's data has been successfully backed up within a certain time since a last scheduled automated backup time. If the user performs backup manually, the client may show a green icon if the user has backed up within a last specified period of time. Further still, the client may use, for example, a yellow icon to indicate that the user's data has never been backed up or has not been backup up recently. Further still, for example, the client may use a red icon to indicate that the last attempted backup resulted in a fatal error.

In one or more embodiments, the client may perform one or more of the following checks before a data backup process. The synchronization server 108 may allow the client to perform a data backup if the user's account is provisional or active. Further, if the user's account is disabled, the client may display a login error message and cancel backup activity. Moreover, the client may validate a token with the synchronization server 108 to authenticate the user before performing data backup activity. If validation fails and the application is running in the foreground, the client may show a login retry dialog, which may present the user with the ability to reset his/her password or authenticate with account management server 106. If the user is able to authenticate via the login retry dialog, the client may continue with the data backup process. If the user is not able to authenticate via the login retry dialog, the client may treat the data backup as canceled. Moreover, if validation fails and an application is running in the background, the client may notify the user via a system notification that the authentication has failed. When the user successfully authenticates with the system, pending system notifications may be deleted. If validation fails, the client may not attempt another automated backup until the error condition is fixed.

Further, in one or more embodiments, the client may confirm that a radio is turned on. If the radio is not on and the client is running in the foreground, the client may prompt the user if he/she wants to turn on the radio. If the user selects "yes", the client turns the radio on and proceeds. If the selection is "no", the client may cancel the data backup process display an error message. If the radio is not on and the client is running in the background, the client may cancel the data backup process and notify the user of the failure. In this case, the client may start a data backup automatically when the radio is next turned on and the client device 102 goes into sleep mode. The client may then not start another automated backup until the radio is turned on.

Moreover, in one or more embodiments, the client may confirm that the client device 102 is in range of data coverage. If the client device 102 is out of data coverage range and the client is running in the foreground, the client may cancel the data backup process and display an error message. If the client device 102 is out of data coverage range and the client is running in the background, the client may cancel the data backup process and accordingly notify the user. The client may start a data backup process automatically when the condition is fixed. Further, the client may not start another automated backup until the condition is fixed.

Additionally, in one or more embodiments, the client may determine if the client device 102 is in a roaming mode. If a "do not backup when roaming" preference is set to "true" and the client is running in the background, the client may cancel the data backup process. The client may start a data backup process automatically when the condition is fixed. Further, the client may not start another automated backup until the condition is fixed.

Further, in one or more embodiments, the client may confirm that a battery is at a sufficient level to complete a data backup. If the battery level is not sufficient and the client is running in the foreground, the client may cancel the data backup process and display an error message. If the battery level is not sufficient and client is running in the background, the client may cancel the data backup process and notify the user accordingly. Further, the client may start a data backup automatically when the battery level is sufficient. Moreover, the client may not start another automated backup until the battery level is sufficient. If the client is running in the foreground and backup activity fails for some reason, the client may notify the user that the data backup has failed. If the client is running in the background and the data backup process fails for some reason, the client may not immediately notify the user.

Moreover, in one or more embodiments, the client may perform, for example, the following retry schedule after encountering an unknown data backup failure: 1st retry—1 minute; 2nd retry—5 minutes; 3rd retry—30 minutes; 4th retry—2 hours; 5th retry—6 hours; 6th retry—12 hours; and 7th retry—24 hours. If all retries fail, the client may notify the user accordingly.

Further, in one or more embodiments, the client may clear alerts generated by system notifications if the data backup becomes successful. Moreover, if the client is in the process of a retry schedule, other automated backups may be disallowed. Further still, if a successful data backup is performed, pending retries may be cancelled. Still further, the client may display information about the retry cycle including the number of failures, time of last failure, scheduled time of next attempt, and reason for failure.

Additionally, in one or more embodiments, the client application main screen may indicate device data signal strength and battery level.

Further, in one or more embodiments, the synchronization server 108 may be able to detect inactive backup accounts. When the synchronization server 108 detects an inactive backup account, the synchronization server 108 may notify an account holder via e-mail that their backup account is inactive and that backed up user data will be deleted after a certain period of time if no additional backup or restore activities are performed by the user. If no additional backup or restore activities are performed on the inactive account within the certain period of time, backed up user data may be deleted from the synchronization server 108. In this case, the synchronization server 108 may send an e-mail to the user indicating that their user data has been deleted from the synchronization server 108 and informing the user that the user can re-login and perform a new initial backup if the user wishes to continue using the service. When the user's backup data is deleted due to inactivity, the user's account is not necessarily deleted.

When a restore activity is initiated, the client may retrieve target data and restore all that data to the client device 102. In one or more embodiments, the restore may actually be a bi-directional synchronization operation. Further, the restore operation may be performed in the background.

During a restore operation, if the client is active, the client may display status to the user including type of data currently being restored and an overall completion percentage. Moreover, during a restore operation, the client may prevent an automated backup from being initiated until the restore process is completed.

Still further, in one or more embodiments, during a restore operation, the client may provide the user the ability to pause the restore operation. When paused, the restore activities may be put on hold. Further, when paused, the client may provide user with the ability to restart the restore operation. Additionally, when paused, the client may suspend an automated backup and disable a manual data backup until the restore operation is completed.

Moreover, in one or more embodiments, before a restore operation begins, the client may inform the user of the following. The user may be informed that local data and settings will be restored to the client device 102. Further, the user may be presented with an estimate of time and data usage required to perform the restore. Moreover, the user may be informed of the time and date that the last successful backup was performed. Also, the user may be given the opportunity to cancel the restore operation at this point.

Additionally, in one or more embodiments, the client may be able to perform a restore operation after an initial device login. After the user has logged in to the client device 102 for the first time, the client may offer the user the ability to do a restore operation if the user has existing backup data on the synchronization server 108 that can be restored to the client device 102. If the user does not have data backed up on the synchronization server 108, the client does not offer user the option to perform a restore operation. If the client is unable to determine whether the user has data backed up on the synchronization server 108, the client operates as if there is data available on the synchronization server 108 to restore. If the user chooses to restore and no data is backed up on the synchronization server 108, the client may inform the user that no data was restored to the client device 102.

In one or more embodiments, the client may perform the following checks before a restore operation. The synchronization server 108 may only allow the client to perform a restore operation if the user's account is in State B or C. If the user's account is not in State B or C, the client may display a login error message and cancel restore activity.

Further, in one or more embodiments, the client may confirm that a radio is turned on. If the radio is not on, the client must ask the user if he/she wants to turn on the radio. If the user selects "yes", the client turns the radio on and proceeds with a restore operation. If the user selects "no", the client may cancel the restore activity and display an error message. The client may offer the user the option to retry the restore operation later.

Moreover, in one or more embodiments, the client may confirm that the client device 102 is in range of data coverage. If the client device 102 is out of data coverage range, the client may cancel restore activity and display an error message. The client may then offer the user the option to retry the restore operation later.

Still further, in one or more embodiments, the client may confirm that the battery is at a sufficient level to complete a restore operation. If the battery level is not sufficient, the client may cancel the restore activity and display an error message accordingly. The client may then offer the user the option to retry the restore operation later.

Additionally, in one or more embodiments, the client may confirm that the client device 102 has enough memory available to complete the restore operation. If there is not enough memory available, the client may cancel the restore activity and display an error message accordingly. The client may then offer the user the option to retry the restore operation later.

In one or more embodiments, if the client fails to start a restore process for some reason, the client may notify the user that the restore has failed. The client may then offer the user the option to retry the restore operation later.

Further, in one or more embodiments, during a restore operation, if the restore activity fails for some reason, the client may pause the restore operation and follow a retry schedule. When paused, the client may provide the user with the ability to restart the restore operation. Further, when paused, the client may suspend an automated backup and disable a manual backup until the restore process is completed.

Moreover, in one or more embodiments, the client may perform, for example, the following retry schedule after encountering an unknown restore failure: 1st retry—1 minute; 2nd retry—5 minutes; 3rd retry—30 minutes; 4th retry—2 hours; 5th retry—6 hours; 6th retry—12 hours; and 7th retry—24 hours. If all retries fail, the client may notify the user accordingly.

Additionally, in one or more embodiments, the client may support migration (backup from one device, restore to another) from a supported client device to a different client device running the same operating system. Further, the client may convert a format of backed-up data as is necessary so that when it is restored, it is in the proper format for the target device. Moreover, in one or more embodiments, the client may not allow the user to restore data from one operating system to a different operating system. Still further, the client may not restore non-applicable settings when migrating to a different type of device.

Additionally, in one or more embodiments, the client may restore data in such a manner so that regularly ongoing synchronization activities by the user are not negatively impacted and duplicates are not created on the client. If the user has performed an initial synchronization operation and is attempting to perform a restore, the client may ask the user if server data or device data should win in case of a conflict.

After a successful restore operation, the client may inform the user that the restore operation was successful via an alert. Further, after successful restore, the client may proceed with scheduled automated backups.

Further, during a restore operation, the client may merge existing data on the client device 102 with retrieved data. In such a manner, via use of a data de-duping module 908, the restore process does not create duplicates. Typically, duplicative data may be detected and removed at the server level. Here, in one or more embodiments, and possibly under control of the synchronization server 108, data de-duping occurs at the client device 102. In other words, the de-duping module 908, upon wirelessly receiving previously backed up user data, can detect and remove redundant data items so that only one instance of a particular data item remains. Examples of user data that may be processed by the de-duping module 908 include calendar data, contact data, task data, memo data, browser bookmark data, phone application shortcut data (e.g., speed dial number data), call log data, application settings data, and SMS message history data.

Further, in one or more embodiments, it may not be necessary that two data items be exactly identical in order for one of the items to be removed by the de-duping module 908. For example, if a first phone number data item is "800-123-4567", and a second phone number data item is "8001234567" or "(800) 123-4567", the de-duping module 908 may recognize the data items as being identical for purposes of phone number contact data, in which case one of the phone number data items is removed. Moreover, in one or more embodiments, the de-duping module 908, and the de-duping functionality of system 100 in general, may occur automatically. In other words, differences among user data may be resolved automatically and without query to a user.

Moreover, in one or more embodiments, the de-duping module 908 may be capable of detecting duplicate data items that are received via different synchronization mechanisms. For example, those skilled in the art will note that various vendors offer synchronization engines. In general, such synchronization engines synchronize data of different types. For example, one particular synchronization engine may be used to synchronize contact, calendar, and memo data items, while another synchronization engine may be used to synchronize call history, browser bookmarks, phone favorites, contact, calendar, and memo data items. Thus, the client device 102 may have duplicate data items received in response to synchronization operations performed with different synchronization engines. In one or more embodiments, the de-duping module 908 is capable of detecting duplicate data items even in view of the use of different synchronization engines.

Figure 15:
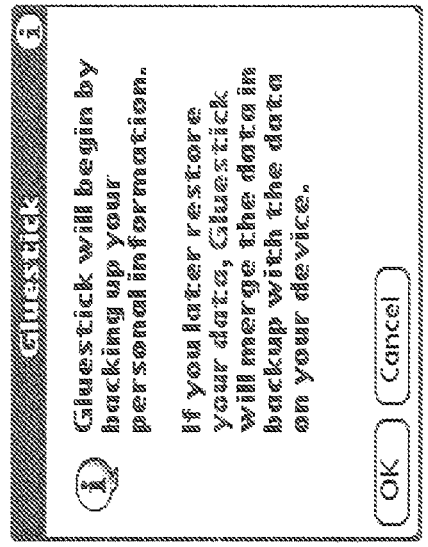

FIG. 15 shows a flow process of a client-side de-duping operation in accordance with an embodiment of the present invention. Initially, in a particular database, an nth record is read 750. If the end of the database has been reached 752, the de-duping operation ends 754. Otherwise, if the end of the database has not been reached 752, a determination is made as to whether the nth record has been deleted 756. If the record has been deleted, n is incremented 770, and the process goes back and reads the new nth record 750.

If the nth record has not been deleted 756, a next record is read 758. If the next record marks the end of the database 760, n is incremented 770, and the process goes back and reads the new nth record 750. Otherwise, if the end of the database has not been reached 760, a determination is made as to whether the nth record and the next record are of the same size 762. If these records are not of the same size 762, then a new next record is read 758 for subsequent comparison with the nth record. However, if the nth record and the next record are of the same size 762, a binary compare is performed on the nth record and the next record 764. If the binary compare indicates that the records are not identical 766, then a new next record is read 758 for subsequent comparison with the nth record. However, if the binary compare indicates that the nth record and the next record are identical 766, the next record is deleted 768, and a new next record is read 758 for subsequent comparison with the nth record. Further, those skilled in the art will note that in the manner described above, a binary compare operation may be performed only when it is needed (e.g., after comparison of sizes and other checks), so as to prevent unnecessary binary compare operations.

In one or more embodiments, the set of databases subject to de-duping as described above may be specified in a list of user or administrator preferences. Moreover, preferences may indicate what types of data are desired to be de-duped. Different types of databases may correspond to different synchronization engines used by the client device 102 to perform data synchronization.

While the invention has been described with respect to a limited number of embodiments, those skilled in the art, having benefit of the above description, will appreciate that other embodiments may be devised which do not depart from the scope of the present invention as described herein. Accordingly, the scope of the present invention should be limited only by the appended claims.

What is claimed is:

1. A system, comprising:
an instruction interface configured to receive an instruction from a user to restrict access to user data stored on a mobile computing device; and
a transmission interface configured to wirelessly transmit a computing command executable by the mobile computing device, wherein the computing command is generated in response to the instruction to restrict access to the user data, wherein execution of the computing command results in the mobile computing device erasing the user data on the mobile computing device.

2. The system of claim 1, wherein execution of the computing command results in the mobile computing device locking the user data from being accessible through use of the mobile computing device.

3. The system of claim 1, wherein execution of the computing command results in the mobile computing device, prior to the erasing of the user data, wirelessly transmitting a copy of the user data.

4. The system of claim 1, wherein the computing command is wirelessly communicated in a form of at least one of an HTTP message and an SMS message.

5. The system of claim 1, wherein a phone functionality of the mobile computing device is accessible after restriction of the accessibility to the user data.

6. The system of claim 1, wherein the mobile computing device is configured to wirelessly transmit a status signal indicating one of a completion and failure of the restriction of the accessibility to the user data.

7. The system of claim 1, wherein execution of the computing command results in the mobile computing device carrying out the restriction of the accessibility to the user data regardless of whether the mobile computing device is connected to a service network.

8. The system of claim 1, wherein the mobile computing device is any one of a mobile phone, a personal digital assistant, a portable e-mail device, and a laptop computer.

9. The system of claim 1, wherein the instruction interface is further configured to authenticate the user prior to wirelessly sending the computing command to the mobile computing device.

10. The system of claim 1, wherein the user data comprises at least one of calendar data, contact data, task data, memo data, browser bookmark data, phone application shortcut data, speed dial number data, call log data, application settings data, and SMS message history data.

11. The system of claim 1, wherein the computing command is not dependent on a synchronization engine used by the mobile computing device to synchronize data.

12. A method of managing a client device, comprising:
receiving an instruction from a user to restrict access to user data stored on the client device;
authenticating the user;
in response to successful authentication, generating a restriction command corresponding to the received instruction;
wirelessly transmitting the restriction command for execution by the client device; and
allowing a phone functionality of the client device to be accessible after the restriction of the accessibility to the user data.

13. The method of claim 12, further comprising:
receiving a confirmation from the client device, the confirmation indicating whether the restriction command was successfully executed by the client device.

14. The method of claim 12, wherein execution of the restriction command results in the client device locking the user data from being accessible using the client device.

15. The method of claim 12, wherein execution of the restriction command results in the client device locking the user data from being accessible using the client device and wirelessly backing up the user data to a remote data store.

16. The method of claim 12, wherein execution of the restriction command results in the client device erasing the user data from the client device.

17. The method of claim 12, wherein execution of the restriction command results in the client device locking the user data from being accessible using the client device and erasing the user data from the client device.

18. The method of claim 12, wherein execution of the restriction command results in the client device locking the user data from being accessible using the client device, wirelessly backing up the user data to a remote data store, and erasing the user data from the client device.

19. The method of claim 12, wherein the restriction command is wirelessly communicated to the client device in a form of an HTTP message and an SMS message.

20. The method of claim 12, wherein the client device is any one of a mobile phone, a personal digital assistant, a portable e-mail device, a desktop computer, and a laptop computer.

21. The method of claim 12, wherein the user data comprises at least one of calendar data, contact data, task data, memo data, browser bookmark data, phone application shortcut data, speed dial number data, call log data, application settings data, and SMS message history data.

22. The method of claim 12, wherein the restriction command is not dependent on a synchronization engine used by the client device to synchronize data.

23. A mobile computing device, comprising:
a first module configured to wirelessly receive a first command and further configured to, in response to receiving the first command, locking user data on the mobile computing device from being accessible using the mobile computing device; and
a second module configured to wirelessly receive a second command and further configured to, in response to receiving the second command, erasing user data on the mobile computing device.

24. The mobile computing device of claim 23, wherein the user data comprises at least one of calendar data, contact data, task data, memo data, browser bookmark data, phone application shortcut data, speed dial number data, call log data, application settings data, and SMS message history data.

25. The mobile computing device of claim 23, wherein at least one of the first command and the second command are wirelessly received in a form of at least one of an HTTP message and an SMS message.

26. The mobile computing device of claim 23, wherein the second module is further configured to wirelessly backup the user data to a remote data store prior to erasing the user data.

27. The mobile computing device of claim 23, wherein at least one of the first command and the second command is not dependent on a synchronization engine used by the mobile computing device to synchronize data.

28. The mobile computing device of claim 23, further comprising:
a third module configured to enable a phone functionality of the mobile computing device, wherein the third module is further configured to allow accessibility to the phone functionality after at least one of the first module has locked the user data and the second module has erased the user data.

29. The mobile computing device of claim 23, wherein at least one of the first command and the second command are wirelessly received by the mobile computing device in response to a user instruction received and authenticated at a remote system.

30. The mobile computing device of claim 23, wherein the first module is further configured to wirelessly transmit a status signal indicating one of successful completion and failure of the locking of the user data.

31. The mobile computing device of claim 23, wherein the second module is further configured to wirelessly transmit a status signal indicating one of successful completion and failure of the erasing of the user data.

* * * * *